(12) United States Patent
Acharya et al.

(10) Patent No.: US 9,460,357 B2
(45) Date of Patent: Oct. 4, 2016

(54) PROCESSING TEXT IMAGES WITH SHADOWS

(71) Applicant: QUALCOMM Incorporated, San Diego, CA (US)

(72) Inventors: Hemanth P. Acharya, Bangalore (IN); Pawan Kumar Baheti, Bangalore (IN); Kishor K. Barman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/150,682

(22) Filed: Jan. 8, 2014

(65) Prior Publication Data

US 2015/0193667 A1 Jul. 9, 2015

(51) Int. Cl.
  *G06K 9/00* (2006.01)
  *G06K 9/38* (2006.01)
  *G06K 9/18* (2006.01)
  *G06T 7/00* (2006.01)

(52) U.S. Cl.
  CPC . *G06K 9/18* (2013.01); *G06K 9/38* (2013.01); *G06T 7/0079* (2013.01); *G06T 2207/20021* (2013.01); *G06T 2207/30244* (2013.01)

(58) Field of Classification Search
  CPC ............ G06K 9/18; G06K 9/38; G06T 2207/30244; G06T 2207/20021; G06T 7/0079
  USPC ......................................................... 382/165
  See application file for complete search history.

(56) References Cited

U.S. PATENT DOCUMENTS 7,167,281 B1  1/2007  Fujimoto et al.
8,494,284 B2 *  7/2013  Parameswaran et al. .... 382/195
9,043,349 B1 *  5/2015  Lin et al. ...................... 707/758
2010/0158373 A1 *  6/2010  Li et al. ........................ 382/172
2012/0321180 A1  12/2012  Friedhoff
2012/0321222 A1  12/2012  Smith et al.
2013/0129216 A1 *  5/2013  Tsai et al. ..................... 382/170
2013/0195315 A1  8/2013  Baheti et al.

FOREIGN PATENT DOCUMENTS

CN        101859382 A      10/2010
EP        0803842 A2       10/1997

OTHER PUBLICATIONS

Michael Donoser et al. (Efficient Maximally Extremal Region (MSER) Tracking, IEEE, 2006).*
Chen H., et al., "Robust Text Detection in Natural Images With Edge-Enhanced Maximally Stable Extremal Regions," believed to be published in IEEE International Conference on Image Processing (ICIP), Sep. 2011, pp. 1-4.
International Search Report and Written Opinion—PCT/US2015/010198—ISA/EPO—May 8, 2015.
Finlayson, G.D. et al., "On the Removal of Shadows from Images," IEEE Transactions on Pattern Analysis and Machine Intelligence, vol. 28, No. 1, Jan. 2006, pp. 59-68.

* cited by examiner

*Primary Examiner* — Kanjibhai Patel
(74) *Attorney, Agent, or Firm* — Silicon Valley Patent Group LLP

(57) ABSTRACT

Embodiments disclosed facilitate robust, accurate, and reliable recovery of words and/or characters in the presence of non-uniform lighting and/or shadows. In some embodiments, a method to recover text from image may comprise: expanding a Maximally Stable Extremal Region (MSER) in an image, the neighborhood comprising a plurality of sub-blocks; thresholding a subset of the plurality of sub-blocks in the neighborhood, the subset comprising sub-blocks with text, wherein each sub-block in the subset is thresholded using a corresponding threshold associated with the sub-block; and obtaining a thresholded neighborhood.

28 Claims, 13 Drawing Sheets

PROCESSING TEXT IMAGES WITH SHADOWS

FIELD

The subject matter disclosed herein relates to Optical Character Recognition, and in particular to Optical Character Recognition in the presence of non-uniform lighting.

BACKGROUND

The presence of non-uniform lighting and/or shadows, which create variations in image intensity levels, may detrimentally affect the reliability of Optical Character Recognition (OCR) techniques applied to the images. In many OCR approaches, text is recognized in an image by localizing each word and/or character in the image, which is followed by classification of the word and/or character. Recent localization techniques have focused on pixel grouping/merging approaches because they yield good text localization results with relatively low computational overhead.

For example, Maximally Stable Extremal Regions (MSER) based methods are often used for character segmentation during OCR. MSER based methods typically identify regions of contiguous pixel sets (termed "Connected Components"), whose pixel intensities differ from pixel intensities within a region bounded by the Connected Component (CC) by some predetermined threshold, and where the size of the CC is stable across several intensity thresholds. MSERs may be viewed as CCs, where pixels inside the CC have either higher or lower intensity than all pixels on the CC.

Because MSER identification is dependent on pixel intensities, the presence of shadows or non-uniform lighting in images may impact the identification of CCs. The term "shadows" as used herein refers broadly to variations in pixel intensities caused by non-uniform lighting and/or contrast variations. For example, when shadows are present, only a portion of a word in an image may be obtained as a connected component, thereby leading to errors or inaccuracies in the OCR process.

Therefore, there is a need for systems, apparatus and methods that facilitate robust and accurate recovery of words and/or characters reliably in the presence of non-uniform lighting and/or shadows.

SUMMARY

In some embodiments, a method may comprise: expanding a Maximally Stable Extremal Region (MSER) in an image to obtain a neighborhood associated with the MSER, the neighborhood comprising a plurality of sub-blocks; thresholding a subset of the plurality of sub-blocks in the neighborhood, the subset comprising sub-blocks with text, wherein each sub-block in the subset is thresholded using a corresponding local threshold associated with the sub-block and obtaining a thresholded neighborhood.

In a further aspect, a method performed on a mobile station (MS) comprising a camera coupled to a flash may comprise: obtaining a region in an image captured by the camera, the image region being obtained, at least in part, based on user input; obtaining a measure of shadow extent in the image region; and adjusting an illumination level of the flash based on the measure of shadow extent, wherein the adjusted illumination level of the flash is used to capture a subsequent image with the camera. In some embodiments, the measure of shadow extent may be obtained based, at least in part, on at least one of: a comparison of an absolute average pixel intensity difference between the first and second boundaries with an intensity difference threshold; or a comparison of an entropy of a pixel intensity histogram for the neighborhood with an entropy threshold; or an analysis of a pixel intensity distribution in the pixel intensity histogram for the neighborhood.

In another aspect, a Mobile Station (MS) may comprise: a camera, the camera to capture an image, and a processor coupled to the camera. In some embodiments, the processor may be configured to: expand a Maximally Stable Extremal Region (MSER) in the image to obtain a neighborhood associated with the MSER, the neighborhood comprising a plurality of sub-blocks; thresholding a subset of the plurality of sub-blocks in the neighborhood, the subset comprising sub-blocks with text, wherein each sub-block in the subset is thresholded using a corresponding local threshold associated with the sub-block; and obtaining a thresholded neighborhood.

In another aspect, a Mobile Station (MS) may comprise: a camera, the camera to capture an image of an environment, a flash coupled to the camera, the flash to illuminate the environment in conjunction with the capture of the image by the camera based an illumination level associated with the camera, a processor coupled to the camera and the flash. In some embodiments, the processor may be configured to: obtain a region in an image captured by the camera, the image region being obtained, at least in part, based on user input; obtain a measure of shadow extent in the image region; and adjust an illumination level of the flash level based, at least in part, on the measure of shadow extent. In some embodiments, the processor may be configured to determine the measure of shadow extent based, at least in part, on at least one of: a comparison of an absolute average pixel intensity difference between the first and second boundaries with an intensity difference threshold; or a comparison of an entropy of a pixel intensity histogram for the neighborhood with an entropy threshold; or an analysis of a pixel intensity distribution in the pixel intensity histogram for the neighborhood.

Embodiments disclosed also pertain to an apparatus comprising: image obtaining means, the image obtaining means to obtain an image, and text processing means coupled to the image obtaining means. In some embodiments, the text processing means may further comprise: means for expanding a Maximally Stable Extremal Region (MSER) in the image to obtain a neighborhood associated with the MSER, the neighborhood comprising a plurality of sub-blocks; means for thresholding a subset of the plurality of sub-blocks in the neighborhood, the subset comprising sub-blocks with text, wherein each sub-block in the subset is thresholded using a corresponding local threshold associated with the sub-block; and means for obtaining a thresholded neighborhood.

In another embodiment, an apparatus may comprise: imaging means, the imaging means to capture an image of an environment; illumination means coupled to the imaging means, the illumination means to illuminate the environment in conjunction with the capture of the image by the imaging means based an illumination level associated with the imaging means; and text processing means coupled to the imaging means. In some embodiments, the text processing means may further comprise: means for obtaining a region in an image captured by the imaging means, the image region being obtained, at least in part, based on user input; means for obtaining a measure of shadow extent in the image region; and means for adjusting an illumination level of the flash level based, at least in part, on the measure of shadow extent. In some embodiments, the means for obtaining a measure of shadow extent in the image region may determine the measure of shadow extent is obtained based, at least in part, on at least one of: a comparison of an absolute average pixel intensity difference between the first and second boundaries with an intensity difference threshold; or a comparison of an entropy of a pixel intensity histogram for the neighborhood with an entropy threshold; or an analysis of a pixel intensity distribution in the pixel intensity histogram for the neighborhood.

Embodiments disclosed pertain to a computer-readable medium comprising instructions, which when executed by a processor, perform steps in a method comprising: expanding a Maximally Stable Extremal Region (MSER) in an image to obtain a neighborhood associated with the MSER, the neighborhood comprising a plurality of sub-blocks; thresholding a subset of the plurality of sub-blocks in the neighborhood, the subset comprising sub-blocks with text, wherein each sub-block in the subset is thresholded using a corresponding local threshold associated with the sub-block; and obtaining a thresholded neighborhood.

Embodiments disclosed also pertain to a computer-readable medium comprising instructions, which when executed by a processor on a mobile station (MS) comprising a camera coupled to a flash, performs steps in a method comprising: obtaining a region in an image captured by the camera, the image region being obtained, at least in part, based on user input; obtaining a measure of shadow extent in the image region; and adjusting an illumination level of the flash based on the measure of shadow extent, wherein the adjusted illumination level of the flash is used to capture a subsequent image with the camera. In some embodiments, the measure of shadow extent is obtained based, at least in part, on at least one of: a comparison of an absolute average pixel intensity difference between the first and second boundaries with an intensity difference threshold; or a comparison of an entropy of a pixel intensity histogram for the neighborhood with an entropy threshold; or an analysis of a pixel intensity distribution in the pixel intensity histogram for the neighborhood.

DETAILED DESCRIPTION

Figure 1A:
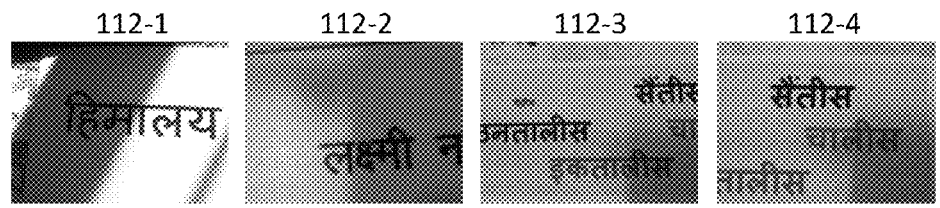
FIG. 1A shows several exemplary images containing shadows.

FIG. 1A shows several exemplary images 112-1, 112-2, 112-3 and 112-4 containing shadows. In situations where a real-world image is captured by a Mobile Station (MS) and/or a camera or an image sensor, such as images of billboards, road signs, informational signs, etc., the presence of shadows, non-uniform lighting and/or contrast variations is more likely. In general, whenever a user has limited control over an environment in which images are being captured, the presence of shadows/non-uniform lighting/contrast variations cannot be ruled out. When shadows, contrast variations and/or non-uniform lighting are present in images the accuracy and reliability of OCR techniques may be affected. The term "shadows" as used herein refers broadly to variations in image intensities such as may be caused by non-uniform lighting and/or contrast variations.

Figure 1B:
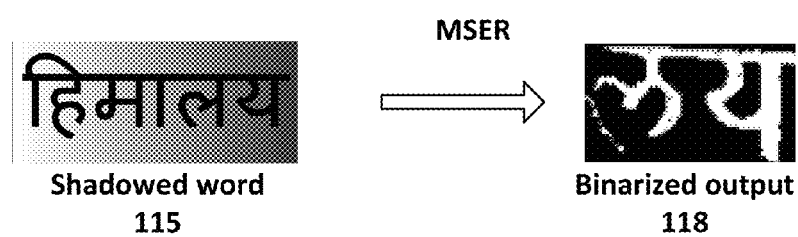
FIG. 1B shows a binarized output image obtained when conventional MSER techniques are applied to binarize an exemplary image containing shadows.

FIG. 1B shows a binarized output image obtained when conventional MSER techniques are applied to binarize an exemplary image containing shadows. As shown in FIG. 1B, the presence of shadows and/or non-uniform lighting may affect the detection of MSERs in shadowed image 115 resulting in a partial detection of the word. For example, as shown in FIG. 1B, when conventional MSER based techniques are used for shadowed word "हिमालय" 115, the binarized output 118 may not contain the entire word. For example, as shown in FIG. 1B, the binarized output "लय" 118, may comprise a portion of shadowed word "हिमालय" 115. Therefore, embodiments disclosed herein facilitate robust, accurate, and reliable recovery of words and/or characters in the presence of non-uniform lighting and/or shadows.

Figure 2:
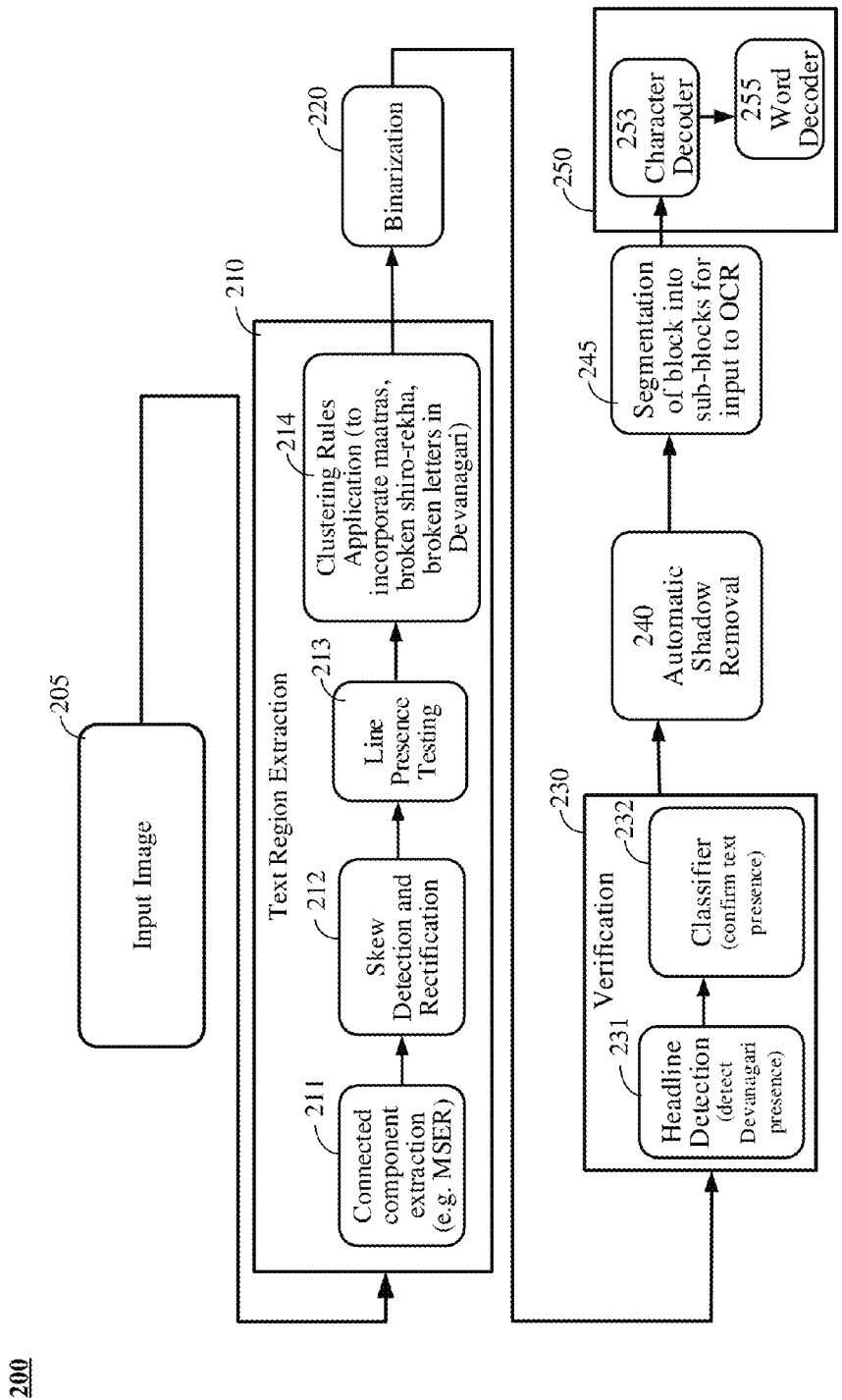
FIG. 2 shows a high level block diagram of modules of an OCR system consistent with disclosed embodiments.

FIG. 2 shows a high level block diagram of modules of an exemplary OCR system 200 consistent with disclosed embodiments. In some embodiments, the modules may be implemented by some combination of hardware, software and/or firmware.

As shown in FIG. 2, exemplary OCR system 200, which may operate on input image 205, may comprise text region extraction module 210, binarization module 220, verification module 230, automatic shadow removal module 240, segmentation module 245, and text recognition module 250. The modules and/or functional blocks shown in FIG. 2 are illustrative and for descriptive purposes only. System 200 may comprise various other modules/functional blocks and/or the functionality associated with the modules/functional blocks may be changed in various ways to achieve functionality consistent with disclosed embodiments.

Text region extraction module 210 may extract one or more regions from image 205, based, for example, on variations in pixel intensities I(x) for points x in image 205. Text extraction module may comprise connected component extraction module 211, skew detection and rectification module 212, line presence testing module 213 and clustering rules module 214.

Connected component extraction module 211 may extract connected components from image 205. In some embodiments, MSER based techniques may be used to extract connected components. MSER techniques may be used to generate a binary image B from image 205 by considering a plurality of thresholds T, so that for each threshold T, the pixel intensity $P_T(x)$ for a pixel x in binary image B is given by $$P_T(x) = \begin{cases} 1, & I(x) \geq T \\ 0, & \text{otherwise} \end{cases}$$

MSERs are connected regions which are stable over a large number of thresholds. For example, in one embodiment, to determine MSERs, pixels x may be ordered by increasing intensity values I(x). Then, the threshold T may be iteratively increased (e.g. by some value $\Delta_T$) and corresponding pixels may added to the binary image $B_T$ and a list of connected components may be returned. The term "connected component" refers to groups of connected pixels that exhibit similar intensity values. In general, connected components may be extracted by connected component extraction module 211 using any appropriate MSER method.

Skew detection and rectification module 212 may rotate identified MSERs to align them to an axis and correct skew. For example, after one or more MSERs in an input image are identified by connected component extraction module 211, skew detection and rectification module 212 may perform skew presence detection followed by skew rectification.

During skew detection, a skew value indicative of skew magnitude M, local to a specific MSER $Q_i$, may be computed, where Q is the set of MSERs and $Q_i \epsilon Q$. In some embodiments, the skew value for an MSER $Q_i$ may be computed, in part, by using: (i) a rectangle or bounding box that fits MSER $Q_i$, which in some instances, may take the form of a "minimum bounding rectangle" and (ii) a count of pixels in MSER $Q_i$. Thereafter, in some embodiments, a number of angles that are candidates for use as skew may be determined based on locations of pixels within the minimum bounding rectangle/bounding box for MSER $Q_i$. Then, a skew angle relative to the axis that is most common across MSERs among these candidate skew angles, may be identified as the angle of skew of the image. In some embodiments, a value of an indicator of skew for each MSER $Q_i$ may be stored either individually (for each region) or in aggregate (across multiple regions), at a specific location in memory 501. In some embodiments, the individual skew values may be used to determine whether skew is present globally, in the image as a whole. For example, statistical methods may be used to compute a mean or a median of the multiple values, followed by filtering outliers among the multiple values, followed by re-computation of mean or median of the filtered values and comparison to a threshold to determine whether or not skew in the image as a whole is acceptable. In general, various known techniques for skew detection and rectification may be used to obtain a skew angle. In some embodiments, connected components and/or MSER regions in the image may be rotated by the negative of the skew angle during rectification.

Next, line presence testing module 213 may determine the presence of a line of pixels of a common intensity value. For example, in many Brahmi scripts, such as the Devanagari family of scripts, a head line (also termed a "shiro-rekha") is used to identify characters that represent a single word. In some embodiments, line presence testing module 213 may be used to determine the presence of lines, including head lines or shiro-rekhas in MSERs.

In some embodiments, clustering rules module 214 may merge a plurality of CCs that are part of a word into a new single clustered connected component when one of the regions satisfies the test for line presence. For example, in Devanagari, two or more CCs, which may be part of a single word, may be disconnected because of diacritical marks and/or the use of half-letters. Diacritical marks (which are also called "maatras") may comprise marks to indicate vowel sounds that are placed in close proximity to base letters often lead to more than one CC for a word. As another example, some letters in Devanagari, such as "शा" may create a break in the ShiroRekha and lead to two CCs. Further, the use of half-letters such as in the word "फुल्का" may also create a plurality of CCs for a single word. Accordingly, clustering rules module 214 may use context, language dependent, and other rules to cluster a plurality of CCs that are part of a word to form a new single clustered connected component.

For example, in one embodiment, CCs in one or more MSERs, which satisfy the test for line presence and are located physically adjacent to a first MSER may be merged with a CC in the first MSER. The CCs may be merged, for instance, when they are sufficiently close to one another as indicated by a specific tests and/or conditions. For example, merging may occur when a distance (or separation) between the CCs is less than the height of the MSERs that satisfy the line presence test).

In some embodiments, Binarization module 220 may operate on the image output by text region extraction module 210 based on the text and background information obtained from the MSER blocks to threshold the image into black and white. In some embodiments, binarization module 220 may binarize regions within bounding boxes (clustered or unclustered) output by clustering rules module 214.

Verification module 230 may then operate on the binarized image output by block 220. In some embodiments, verification module 230 may comprise headline detection module 231, which may verify that a line of pixels of a common binary value is present in the binarized block of a region (whether or not clustered), and classifier module 232, which may classify binarized blocks as text or non-text. In some embodiments, verification module 230 may use various other distinguishing characteristics associated with a language and/or characters in the language to verify the presence of characters in a language. In some embodiments, classifier module may take the form of a neural network classifier, which may learn representations of input that determine the presence of characters. In some embodiments, the classification may be based, in part, on variance in stroke width.

In some embodiments, automatic shadow removal module 240 may operate on binarized MSER text fragments/blocks output by verification module 230 to determine the presence of shadows. In some embodiments, automatic shadow removal module 240 may obtain a neighborhood region around a binarized MSER text fragment and may detect the presence of a shadow in the neighborhood region around the MSER fragment in a manner consistent with disclosed embodiments. In some embodiments, automatic shadow removal module 240 may apply an adaptive thresholding technique to obtain a rebinarized image, which may compensate for the presence of shadows and output the rebinarized image to character segmentation module 245.

In some embodiments, character segmentation module 245 may slice a text region identified by a corresponding bounding box, based on language specific rules. As a consequence of the segmentation, a word or sequence of characters in the bounding box may be segmented into constituent individual characters. In some embodiments, character segmentation module 245 may also characterize the individual characters using feature vectors.

The output of character segmentation module 245 may be used by OCR module 250 to decode and recognize characters. For example, in one embodiment, the feature vectors may be input to multi-stage character decoder 253, which may generate one or more characters as alternatives to one another, optionally with confidence measures for each character in the group as representing a character of text in a specific sub-block. Subsequent stages in multi-stage character decoder 253 may use a variety of techniques including context and/or heuristics along with the confidence measures to resolve any ambiguities. In some embodiments, each group of characters identified by the decoder, may be input to word decoder module 255, which may collect such groups of characters for all sub-blocks in a block/bounding box corresponding to a text region, and output a word that has been selected from a dictionary (not shown). In some embodiments, the dictionary may hold a predetermined set of words and/or sequences of characters.

Figure 3:
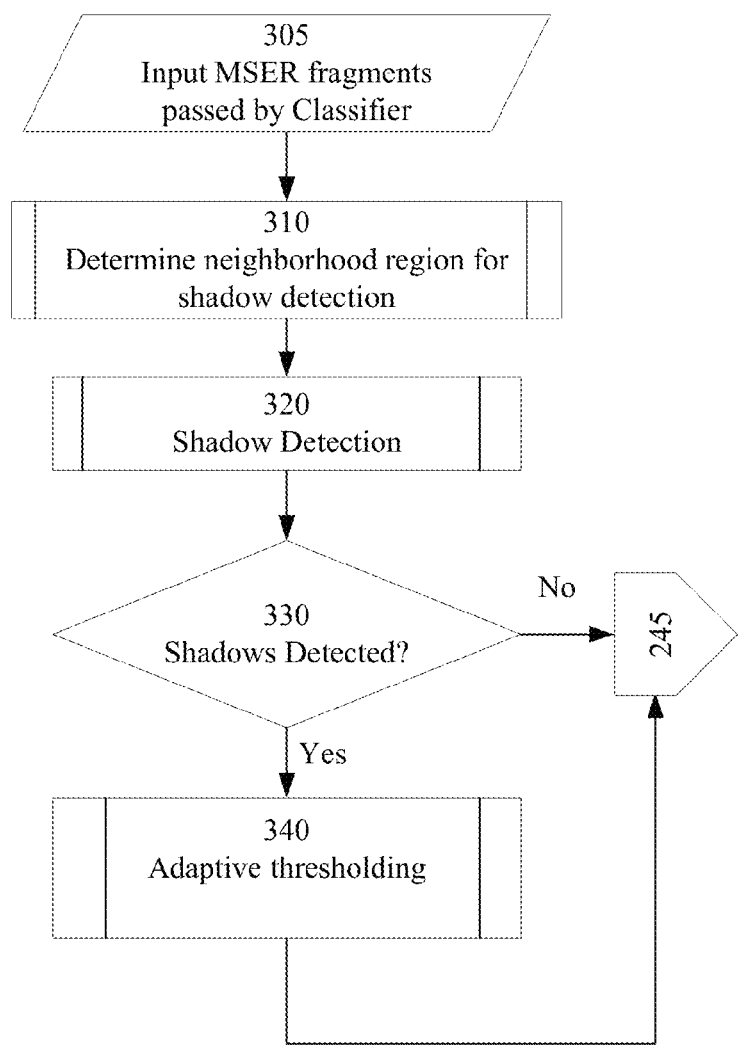
FIG. 3 shows a flowchart of an exemplary method 300 for processing text in the presence of shadows in a manner consistent with disclosed embodiments.

FIG. 3 shows a flowchart of an exemplary method 300 for processing text in the presence of shadows and/or non-uniform lighting conditions in a manner consistent with disclosed embodiments. In some embodiments, portions of method 300 may be performed by automatic shadow removal module 240.

In some embodiments, a neighborhood region N around input binarized MSER text fragment 305 may be determined by subroutine 310. In some embodiments, the neighborhood region N may be used for shadow detection. In some embodiments, the neighborhood region N around input binarized MSER text fragment 305 may be determined by subroutine 310 using binarized MSER text fragment 305 from classifier module 232. In some embodiments, the neighborhood region N may be determined by expanding one or more boundaries of input MSER text fragment 305, (e.g. the left and/or right boundary of input binarized MSER text fragment 305) to encompass a shadowed region, which may include one or more other binarized MSER text fragments.

In some embodiments, neighborhood region N may be indicated by a user. For example, a user may mark neighborhood region N in an image captured by a camera on a Mobile Station. For example, a bounding box may be used to indicate neighborhood region N. In situations, where a neighborhood region N has been identified, in some embodiments, in step 310, word boundaries may be identified within neighborhood region N and the method may proceed to step 320.

Next, in subroutine 320, the existence of shadows may be determined for the neighborhood region N around input binarized MSER text fragment 305.

Next, in step 330, if no shadows are detected ("No" in step 330), then character segmentation module 245 may be invoked. If shadows are detected, ("Yes" in step 330), then adaptive thresholding subroutine 340 may be invoked to operate on the neighborhood region around input binarized MSER text fragment 305.

In some embodiments, adaptive thresholding subroutine 340 may operate to rebinarize the neighborhood region around input binarized MSER text fragment 305 by dividing the neighborhood region N in to sub-blocks and adaptively binarizing sub-blocks including text using local thresholds. In some embodiments, a local threshold may be associated with each sub-block. Accordingly, in some embodiments, adaptive thresholding subroutine 340 may compensate for the presence of shadows and output a rebinarized image, rebinarized based on the local sub-block thresholds, to character segmentation module 245.

Figure 4A:
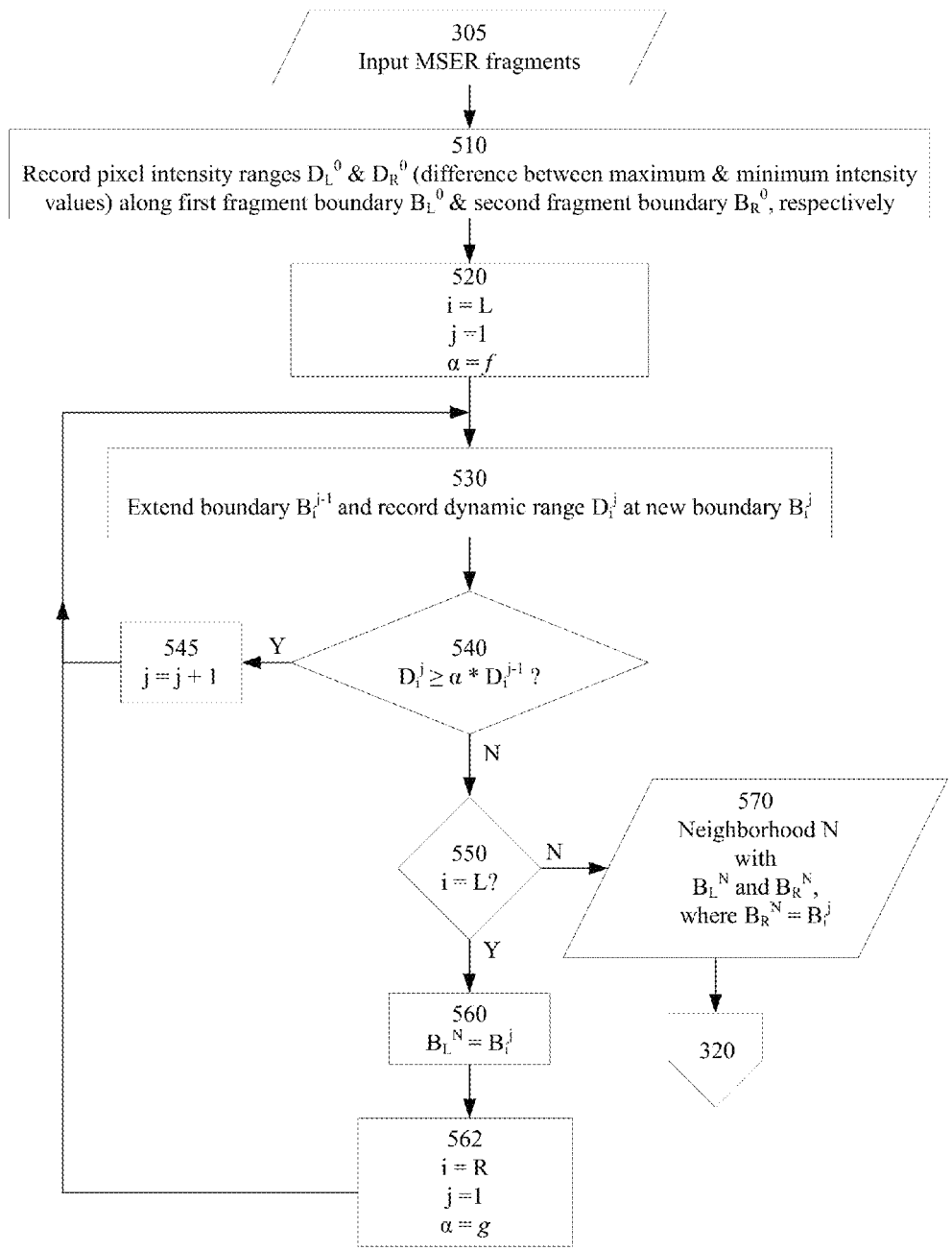
FIG. 4A shows a flowchart of an exemplary method 310 for determining a neighborhood region around an MSER fragment in a manner consistent with disclosed embodiments.

FIG. 4A shows a flowchart of exemplary subroutine 310 for determining a neighborhood region N around an MSER fragment in a manner consistent with disclosed embodiments. In some embodiments, portions of subroutine 310 may be performed by automatic shadow removal module 240 using input binarized MSER text fragment 305.

In some embodiments, neighborhood region N around an input binarized MSER fragment may be determined, at least in part, by extending the boundaries of the MSER fragment. For example, one or more boundaries of a bounding box around the MSER may be extended. In some embodiments, the boundaries, which may be substantially orthogonal to the general text direction, may be extended along the general text direction. In general, the MSER boundary, which may take the form of a bounding box, may be extended in one or more directions.

In step 510, in some embodiments, pixel intensity ranges $D_1^0$ and $D_2^0$ along initial first and second boundaries $B_1^0$ and $B_2^0$, respectively, of input binarized MSER text fragment 305 may be determined. For example, in step 510, the first boundary may be the left ("L") boundary and the second boundary may be the right ("R") boundary and pixel intensity ranges $D_L^0$ and $D_R^0$ along initial left and right boundaries $B_L^0$ and $B_R^0$, respectively, of input binarized MSER text fragment 305 may be determined.

In the following discussion, the terms "L" (left) and "R" (right) may be used to describe a first and second boundary to illustrate operation of the method when the boundaries are extended in two directions and for explanatory purposes only. However, the method is not limited to the examples discussed, and, in general, the method may be applied by extending boundaries of the MSER fragment and/or a bounding box around the MSER fragment in one or more directions.

Accordingly, in step 510, pixel intensity ranges $D_{1=L}^0$ and $D_{2=R}^0$ along the initial left and right boundaries left and right boundaries $B_{1=L}^0$ and $B_{1=R}^0$, respectively, of input binarized MSER text fragment 305 may be determined. For example, the pixel intensity range $D_L^0$ at the initial left boundary $B_L^0$ of input binarized MSER text fragment 305 may be determined as $D_L^0=\max(P_L^0)=\min(P_L^0)$, where $\max(P_L^0)$ and $\min(P_L^0)$ are the maximum and minimum pixel intensities, respectively, of pixels at $B_L^0$. Similarly, the pixel intensity range $D_R^0$ at the initial right boundary $B_R^0$ of input binarized MSER text fragment 305 may be determined as $D_R^0=\max(P_R^0)-\min(P_R^0)$, where $\max(P_R^0)$ & $\min(P_R^0)$ are the maximum and minimum pixel intensities, respectively, of pixels at $B_R^0$.

In step 520, boundary indicator i may be set to "L" (or 1) to indicate a left (or first) boundary and counter j, which may count the number of times the left (first) boundary is extended, may be set to 1. Further, a variable α, may be set to f, where 0<f<1.

Next in step 530, in some embodiments, the left boundary may be extended to $B_i^j$ and new pixel intensity range $D_i^j$ may be computed at $B_j^i$. For example, for i=L, and j=1, the left boundary may be extended from $B_L^0$ to new boundary $B_i^j=B_{i=L}^{j=1}=B_L^1$ by moving boundary $B_L^0$ leftward by one or more pixels.

In some embodiments, a set comprising an ordered sequence of provisional first boundaries $B_1=\{B_{i=1}^j|j=1, 2, \ldots\}$ may be computed. In some embodiments, the ordered sequence of first boundaries may be obtained by expanding the MSER in a first direction to determine a first ordered sequence of provisional first boundaries $B_1=\{B_{i=1}^j|j=1, 2, \ldots\}$. For example, a set comprising an ordered sequence of provisional first boundaries $B_L=\{B_L^j|i=L; j=0, 1, \ldots\}$ may be computed and stored in an array, list, or other suitable data structure. For example, the MSER may be expanded in a first direction to determine a first ordered sequence of provisional first boundaries $B_L=\{B_L^j|j=1, 2, \ldots\}$ and the first provisional first boundary $B_L^1$ in the ordered sequence may be selected and the new pixel intensity range $D_L^1$ may be computed at $B_L^1$.

In step 540, in some embodiments, the dynamic range $D_i^j$ at the new provisional first boundary $B_i^j$ may be compared as with a threshold determined by $\alpha*D_i^{j-1}$. Accordingly in step 540, it may be determined whether $D_i^j \geq \alpha*D_i^{j-1}$. For example, in step 540, for a first iteration where i=L and j=1, the dynamic range $D_i^j=D_{i=L}^{j-1}$ at the new provisional first boundary $B_i^j=B_{i=L}^{j-1}$ may be compared with a threshold determined by $\alpha*D_{i=L}^{(1-1)}=\alpha*D_L^0$, it may be determined whether $D_L^1 \geq \alpha*D_L^0$.

As noted above, for example, for the first direction (where i=1), α may be set to f, where 0<f<1. In some embodiments, α may be a function of the pixel intensity range of a boundary in the previous iteration.

If $D_i^j \geq \alpha*D_i^{j-1}$ ("Yes" in step 540), then, in step 545, the counter j is incremented and the method returns to step 530 to begin another iteration. On the other hand, if $D_i^j < \alpha*D_i^{j-1}$ ("No" in step 540), then, in step 550, the value of boundary indicator i may be checked.

If i=L ("Yes" in step 550), then, in step 560, the left boundary of the neighborhood region $B_L^N$ around input binarized MSER text fragment 305 is set to $B_L^N=B_i^j$. Further, in some embodiments, a left word boundary $B_L^W$ may be set as $B_{i=L}^W=B_i^{j-1}$. The left word boundary $B_L^W$ may indicate the left end of a word in neighborhood region N 570.

In step 562, boundary indicator i may be set to 2 or "R" to indicate a second (e.g. right) direction, the counter j which now counts the number of times the second boundary is extended, may be set to 1. Further, variable α, may be set to g, where 0<g<1.

In some embodiments, the method may then return to step 530 to begin a next set of iterations to extend the second boundary $B_R^0$, which may be the right ("R") boundary $B_R^0$ of input MSER fragment 305.

In some embodiments, a set comprising an ordered sequence of provisional second boundaries $B_2=\{B_{i=2}^j|j=1, 2, \ldots\}$ may be computed. In some embodiments, the ordered sequence of second boundaries may be obtained by expanding input MSER fragment 305 in a second direction to determine a second ordered sequence of provisional second boundaries $B_2=\{B_{i=2}^j|j=1, 2, \ldots\}$. For example, a set comprising an ordered sequence of provisional second boundaries $B_R=\{B_i^j|i=R; j=0, 1, \ldots\}$ may be computed and stored in an array, list, or other suitable data structure. For example, the MSER may be expanded in a second direction to determine a second ordered sequence of provisional first boundaries $B_R=\{B_R^j|j=1, 2, \ldots\}$. At the beginning of the next iteration, the first provisional second boundary $B_R^1$ may be selected and the new pixel intensity range $D_R^1$ may be computed at $B_R^1$. In some embodiments, the method may iterate through steps 530, 540 and 545 until $D_i^j < \alpha*D_i^{j-1}$, or $D_R^j < \alpha*D_R^{j-1}$.

In step 550, if the value of indicator i=R (i≠ "L"/"No" in step 550), then, in step 570, the right boundary of neighborhood N may be set as $B_R^N=B_i^j$. Further, in some embodiments, a right word boundary $B_R^W$ may be set as $B_R^W=B_{i=R}^{j-1}$. The right word boundary $B_R^W$ may indicate the right end of the word. Thus, neighborhood image N 570 around input binarized MSER text fragment 305 may be delimited, at least in part, by left and right boundaries $B_L^N$ and $B_R^N$, respectively. Similarly, in one embodiment, the right and left word boundaries may be delimited by $B_L^W$ and $B_R^W$. The method may then proceed to subroutine 320.

In some embodiments, method 310 may iteratively grow the left and/or right boundaries around input binarized MSER text fragment 305 to determine neighborhood N 570. In some embodiments, one of the iteratively grown regions may be identified as neighborhood N 570 when the pixel intensity range at the left and right boundaries $B_L^N$ and $B_R^N$, respectively, of neighborhood N 570 satisfy conditions $D_L^j < f*D_L^{j-1}$ and $D_R^k < g*D_R^{k-1}$, respectively, for positive integers j, k. In some embodiments, a plurality of boundaries may be determined in parallel. For example, the right and left boundaries $B_L^N$ and $B_R^N$, respectively, of neighborhood N 570 may be determined in parallel.

Figure 4B:
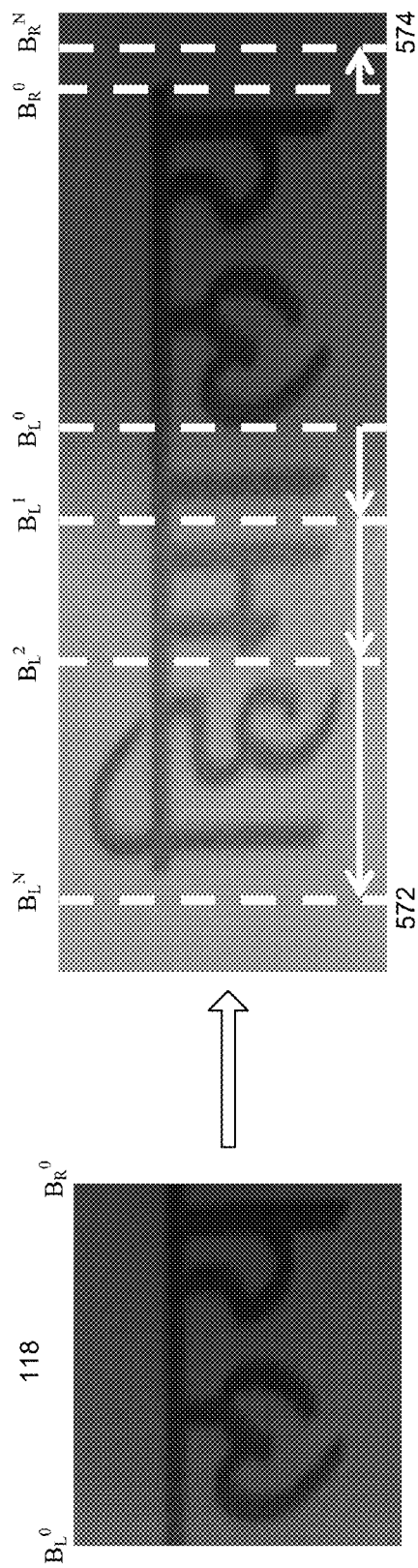
FIG. 4B illustrates expansion of the boundaries exemplary binarized output MSER fragment.

FIG. 4B illustrates expansion of the boundaries exemplary binarized output MSER fragment 118. As shown in FIG. 4B, binarized output fragment 118 may be grown by expanding boundaries $B_L^0$ and $B_R^0$. For example, MSER fragment 118 may be expanded from initial first/left MSER boundary $B_L^0$ to provisional first/left boundaries $B_L^1$, $B_L^2$, ... $B_L^N$, where $B_L^N$ N 572 represents the first/left boundary of neighborhood region 570. Similarly, MSER fragment 118 may be expanded from initial second/right MSER boundary $B_R^0$ to provisional second/right boundaries $B_R^1$, $B_R^2$, ... $B_R^N$, where $B_R^N$ 574 represents the second/right boundary of neighborhood region 570. In some embodiments, the iterative expansion of the boundaries exemplary binarized output MSER fragment 118 (e.g. as shown in FIG. 4B) may be performed by method 310.

Figure 4C:
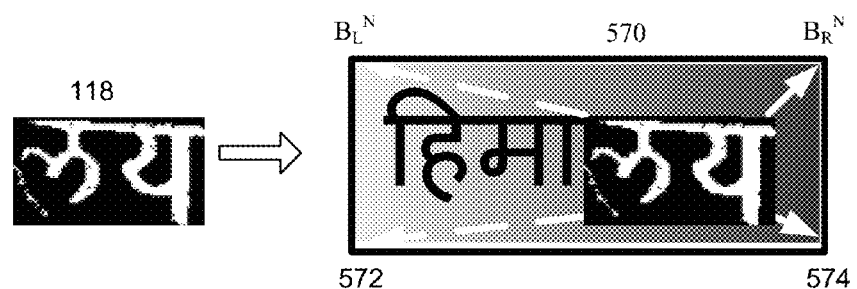
FIG. 4C illustrates the result of expanding exemplary binarized output fragment to a neighborhood region.

FIG. 4C illustrates the result of expanding exemplary binarized output fragment 118 to neighborhood region N 570. As shown in FIG. 4B, binarized output fragment 118 may be grown to neighborhood region N 570. For example, in some embodiments, method 310 may be applied to binarized output fragment 118 to grow binarized output fragment 118 neighborhood region N 570 delimited, at least in part, by boundaries $B_L^N$ and $B_R^N$. For example, in some embodiments, method 310 may iteratively grow the left and/or right boundaries around input binarized MSER text fragment 118 to determine neighborhood N 570 with boundaries $B_L^N$ 572 and $B_R^N$ 574.

FIG. 4C illustrates image intensities at the left and right boundaries $B_L^N$ 572 and $B_R^N$ 574, respectively of neighborhood region N 570 around an MSER fragment. As shown in FIG. 4B, there is less variation in pixel intensity values at boundaries $B_L^N$ 572 and $B_R^N$ 574, of neighborhood N 570 relative to pixels located on lines 576 and 577, which include text. The presence of text increases intensity variations in the image, which is shown in the graphs in FIG. 4D.

Figure 4D:
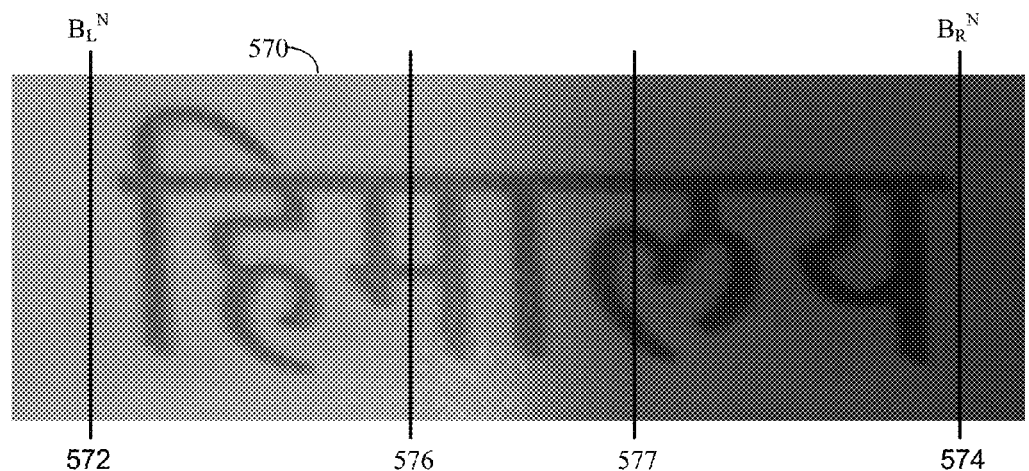
FIG. 4D shows illustrates image intensities at the left and right boundaries of a neighborhood image around an MSER fragment.
Figure 4E:
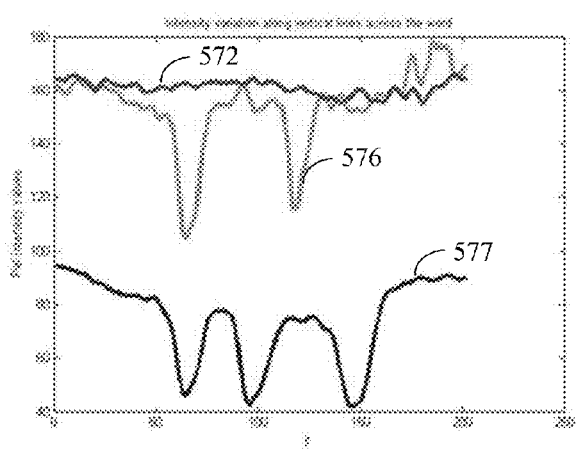
FIG. 4E shows a graph plotting image intensities at three locations for the neighborhood shown in FIG. 4B.

FIG. 4D shows a graph plotting pixel intensities at locations on lines 572, 576 and 577 for neighborhood region N 570 shown in FIG. 4C. As shown in FIG. 4D, the average pixel intensity level for pixels located on line 577 is lower than the average pixel intensity level for pixels located on line 576 because of the presence of shadows. However, as shown in FIG. 4D, pixel intensities on both lines 576 and 577 show variations in image intensities because of the presence of text at those locations. On the other hand, there is relatively little variation in pixel intensities at values at boundary $B_L^N$ 572 of neighborhood N 570 because no text is present on $B_L^N$ 572. In some embodiments, the variation in pixel intensities at locations around an MSER text fragment (e.g. text fragment 118) may be used to determine a neighborhood region (e.g. N 570 delimited by boundaries $B_L^N$ and $B_R^N$) around the MSER text fragment.

Figure 5A:
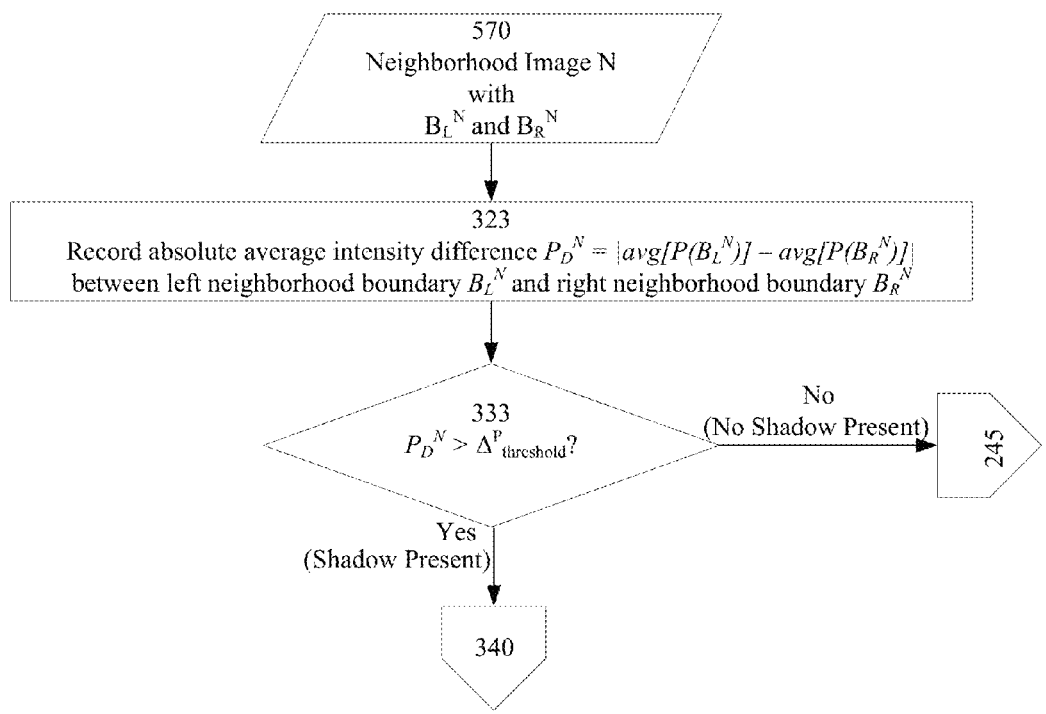
FIGS. 5A, 5B and 5C shows a flowcharts of exemplary methods 600, 625, and 650, respectively, for determining the presence of shadows in a neighborhood region around an MSER fragment in a manner consistent with disclosed embodiments

FIG. 5A shows a flowchart of an exemplary method 600 for determining the presence of a shadow in a neighborhood region around an MSER fragment in a manner consistent with disclosed embodiments. In some embodiments, method 600 may be performed, in part, by routines 320 and 330.

In some embodiments, neighborhood image N 570 with boundaries $B_L^N$ and $B_R^N$, may be input to method 600. In step 323, the absolute average pixel intensity difference $P_D^N$ between boundaries $B_L^N$ and $B_R^N$ may be computed as $P_D^N = |avg[P(B_L^N)] - avg[P(B_R^N)]|$. For example, the average intensity ($avg[P(B_L^N)]$) at $B_L^N$ may be subtracted from the average intensity ($avg[P(B_R^N)]$) at $B_R^N$. $P_D^N$, the average absolute intensity difference, may then be obtained as the absolute value of the difference. In some embodiments, a measure of shadow extent may be obtained based, in part on $P_D^N$.

Next, in step 333, the absolute average pixel intensity difference $P_D^N$ may be compared with an intensity difference threshold $\Delta_{threshold}^P$. In step 333, if $P_D^N > \Delta_{threshold}^P$ ("Yes" in step 333), then it may be determined that a shadow is present and the method proceeds to subroutine 340. On the other hand, in step 333, if $P_D^N \le \Delta_{threshold}^P$ ("No" in step 333), then it may be determined that no shadow is present and the binarized image may be output to character segmentation module 245.

Figure 5B:
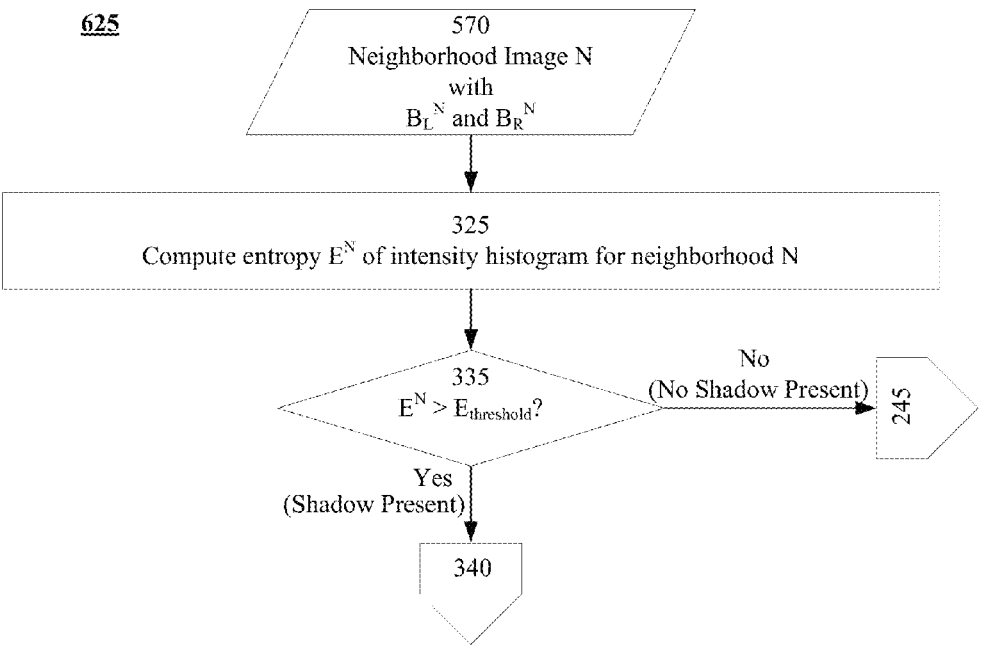

FIG. 5B shows a flowchart of another exemplary method 625 for determining the presence of a shadow in a neighborhood region around an MSER fragment in a manner consistent with disclosed embodiments. In some embodiments, method 625 may be performed, in part, by routines 320 and 330.

In some embodiments, neighborhood image N 570 with boundaries $B_L^N$ and $B_R^N$, may be input to method 600. In step 325, the entropy of the pixel intensity histogram for neighborhood N 570 may be computed. In some embodiments, the entropy of the pixel intensity histogram may be computed by placing the grayscale pixel values into 256 bins ranging from 0-255. A probability distribution of intensity values may be obtained by normalizing the bins. For example, normalization may be performed by dividing the number of pixels in each bin by the total number of pixels in the neighborhood image N 570 to obtain $\rho_i$, where $\rho_i$ is the normalized value of bin i in the histogram and represents the probability that a pixel in neighborhood N will have intensity i and $$\sum_{i=0}^{255} \rho_i = 1.$$

The entropy $E^N$ of the probability distribution may be calculated as $$E^N = \sum_{i=0}^{255} -\rho_i \log_2 \rho_i.$$

In some embodiments, a measure of shadow extent may be obtained based, in part on entropy $E^N$.

In step 335, $E^N$ is compared with entropy threshold $E_{threshold}$. In step 335, if $E^N > E_{threshold}$ ("Yes" in step 335), then it may be determined that a shadow is present and the method proceeds to subroutine 340. On the other hand, in step 335, if $E^N \le E_{threshold}$ ("No" in step 335) then it may be determined that no shadow is present and the method proceeds to character segmentation module 245.

Figure 5C:
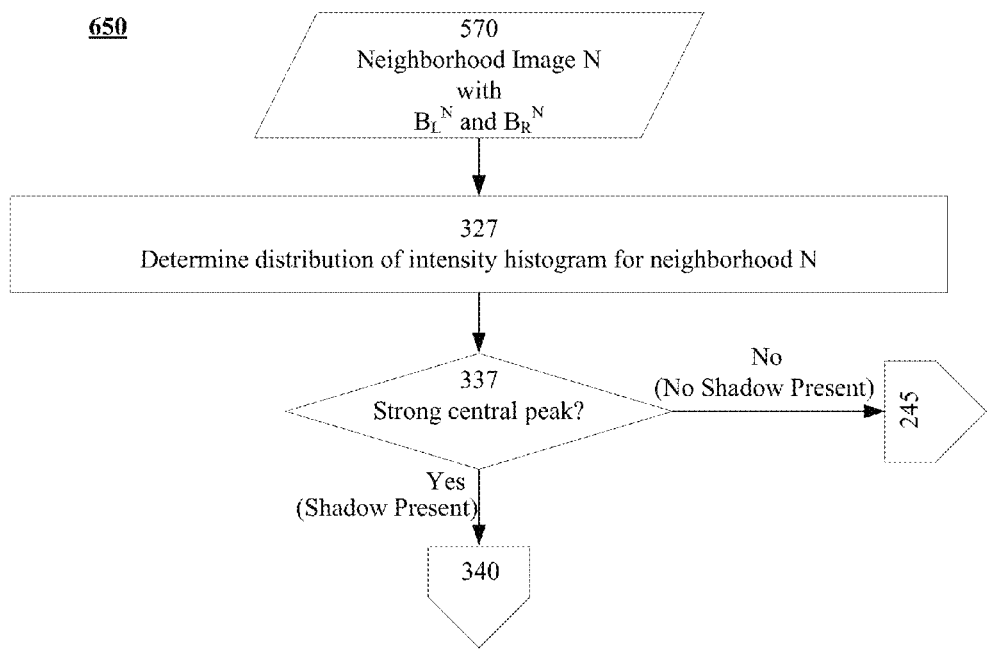

FIG. 5C shows a flowchart of an exemplary method 650 for determining the presence of a shadow in a neighborhood region around an MSER fragment in a manner consistent with disclosed embodiments. In some embodiments, method 650 may be performed, in part, by routines 320 and 330.

In some embodiments, neighborhood image N 570 with boundaries $B_L^N$ and $B_R^N$, may be input to method 650. In step 327, a distribution of pixel intensity values for neighborhood N 570 may be determined. For example, a histogram of pixel intensity values in neighborhood N 570 may be obtained by placing the grayscale pixel values of pixels in neighborhood N 570 into 256 bins ranging from 0-255. A probability distribution of intensity values may be obtained by normalizing the bins. For example, normalization may be performed by dividing the number of pixels in each bin by the total number of pixels in the image to obtain $\rho_i$, where $\rho_i$ is the normalized value of bin i in the histogram and represents the probability that a pixel in neighborhood N will have intensity i and $$\sum_{i=0}^{255} \rho_i = 1.$$

In some embodiments, pixel intensity values for pixels in neighborhood N 570 may be grouped into ranges, so that the total number of bins may be less than 256. Accordingly, $\rho_i$, which is the normalized value of bin i in the histogram, is the probability that a pixel in neighborhood N will fall in the range of intensity values represented by bin i and $$\sum_{i=0}^{255} \rho_i = 1.$$

In some embodiments, a measure of shadow extent may be obtained based, in part on analysis of the distribution of pixel intensity values for neighborhood 570.

Figure 5D:
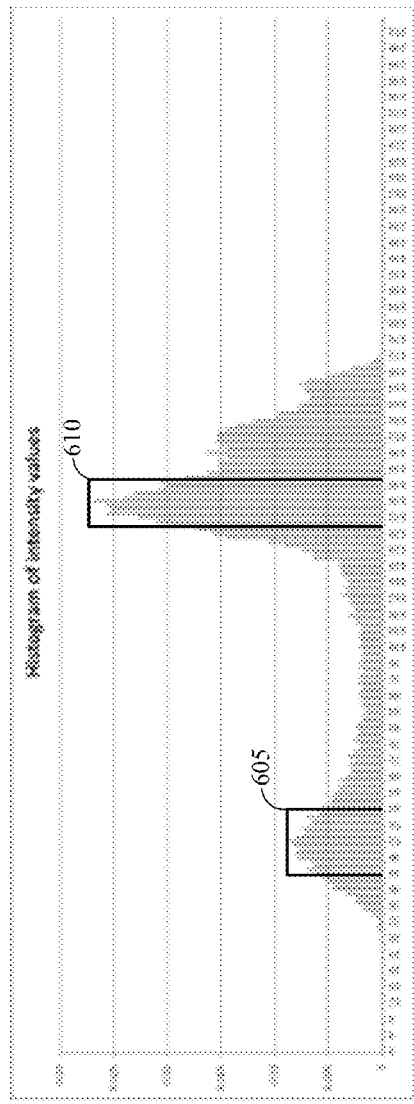
FIG. 5D shows a histogram of pixel intensity values in a neighborhood region around an MSER fragment for an exemplary image without a shadow.
Figure 5E:
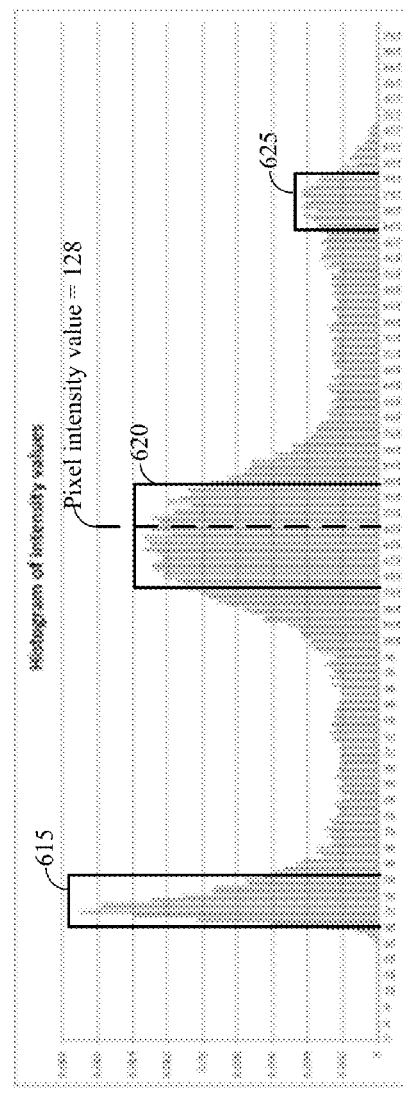
FIG. 5E shows a histogram of pixel intensity values in a neighborhood region around an MSER fragment for an exemplary image with a shadow.

FIG. 5D shows a histogram of pixel intensity values in a neighborhood region around an MSER fragment for an exemplary image without a shadow, while FIG. 5E shows a histogram of pixel intensity values in a neighborhood region around an MSER fragment for an exemplary image with a shadow. When no shadows are present in neighborhood region N 570, the distribution of pixel intensity values is typically bi-modal being distributed between text and non-text intensity values. For example, as shown in FIG. 5D, pixel intensity values may be broadly classified into two groups as shown by the dark lines. The two groups comprise lower pixel intensity group 605 (with pixel intensity values between 44 and 60) and higher pixel intensity group 610 (values between 128 and 140), respectively. Shadows have the effect of increasing the spread of the distribution. For example, as shown in FIG. 5E, pixel intensities are in three pixel intensity groups 615, 620 and 625, including strong central group 620 clustered around the midpoint 128 of the pixel intensity range (which ranges from 0 through 255).

Referring to FIG. 5C, accordingly, in some embodiments, in step 337, the histogram may be examined for a strong central peak. For example, if the histogram shows a strong group of pixel intensities clustered around the midpoint of pixel intensity values ("Yes" in step 337), then, in step 337, it may be determined that a shadow is present and the method proceeds to subroutine 340. When no strong central peak is detected and/or the pixel intensity distribution is determined to be bi-modal, then, ("No" in step 337), it may be determined that a shadow is not present and the method proceeds character segmentation module 245.

Figure 6A:
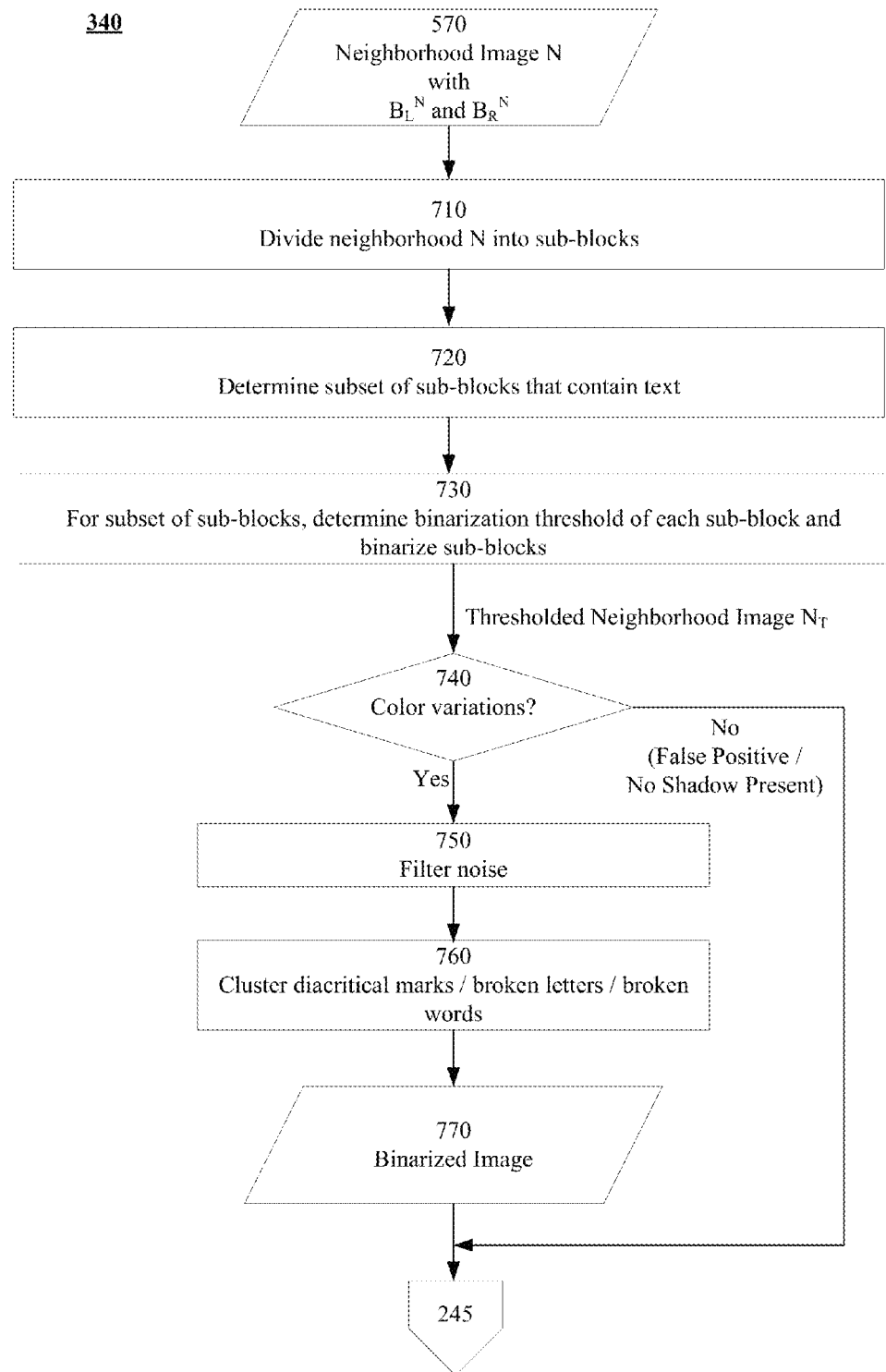
FIG. 6A shows a flowchart for an exemplary method for adaptive thresholding in a manner consistent with disclosed embodiments.

FIG. 6A shows a flowchart for an exemplary method 340 for adaptive thresholding in a manner consistent with disclosed embodiments. In some embodiments, subroutine 340 may be invoked if a shadow is determined to be present by one or more of methods 600, 625 and/or 650. In some embodiments, portions of subroutine 340 may be performed by automatic shadow removal module 240.

Figure 6B:
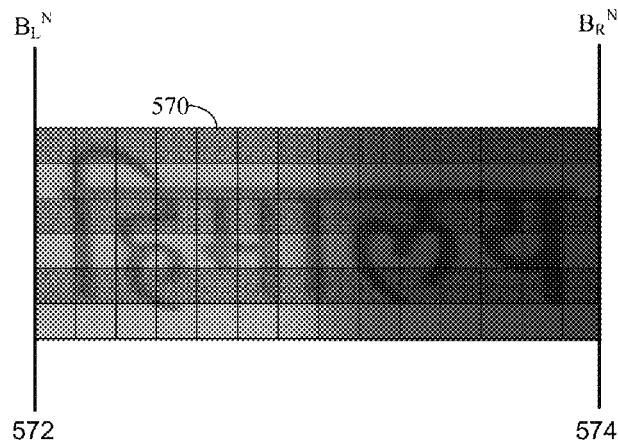
FIG. 6B shows exemplary neighborhood N 570 with boundaries $B_L^N$ 572 and $B_R^N$ 574 divided into equal sized sub-blocks.

In some embodiments, neighborhood N 570 with boundaries $B_L^N$ and $B_R^N$, may be input to subroutine 340. In step 710, neighborhood N 570 may be divided into sub-blocks. For example, in one embodiment, neighborhood N 570 may be divided into equal sized sub-blocks, where the size of each sub-block may be set as k*stroke-width, where k is a heuristic and k>1, which ensures that sub-block size is greater than stroke width. Stroke width may be defined as the thickness of a character outline relative to height and is a reflection of text size relative to overall character structure. The term "stroke" refers to a characteristic of text. Stroke may be viewed as a connected component, which may take the form of a band of approximately constant width. FIG. 6B shows exemplary neighborhood N 570 with boundaries $B_L^N$ 572 and $B_R^N$ 574 divided into equal sized sub-blocks. In some embodiments, neighborhood N 570 with boundaries $B_L^N$ 572 and $B_R^N$ 574 divided into equal sized sub-blocks (e.g. as shown in FIG. 6B) may be obtained after step 710.

In step 720, a subset of sub-blocks in neighborhood N 570 that include text may be determined. For example, a variance of pixel intensity values may be computed for each sub-block in neighborhood N 570. If the variance of pixel intensity values exceeds some threshold variance, then the sub-block may be flagged as containing text.

Next, in step 730, an individual binarization threshold may be determined for each sub-block in the subset of sub-blocks with text in neighborhood N 570 that contain text. For example, each sub-block with text $S_i$ may be associated with a corresponding binarization threshold $T_i$. The binarization threshold $T_i$, which corresponds to sub-block with text $S_i$ may be used to binarize sub-block $S_i$. For example, Otsu's method may be used to binarize each sub-block $S_i$ in the subset and calculate the corresponding binarization threshold $T_i$ for the sub-block. Otsu's method assumes that the image (sub-block containing text) to be thresholded contains two classes of pixels or a bi-modal histogram (e.g. foreground and background) and calculates an optimal threshold to separate the two classes so that their combined intra-class variance is minimized. As a consequence of the sub-block binarization, thresholded neighborhood image $N_T$ may be obtained.

In step 740, words/connected components may be extracted from the thresholded neighborhood image $N_T$ using flood fill. Flood fill uses a start node or start pixel and a target color to determine pixels in thresholded neighborhood image $N_T$ that are connected to the start pixel by a path given by the target color. Pixels in each path (connected component) may be changed to a replacement color. In some embodiments, the start node may be selected from a region in $N_T$ within MSER fragment 305. Thus, in the embodiments above, as a consequence of flood fill, a CC comprising all pixels in thresholded neighborhood image $N_T$ that are connected by a path to the selected pixel (which is located within MSER fragment 305) are extracted.

Following flood fill and word/CC extraction, the values of pixels in original neighborhood image N 570 that correspond to pixels in the flood fill extracted CCs may be checked for color variations. Typically, the presence of shadows is accompanied by color variations in connected components. For example, in step 740, the extracted CCs in neighborhood image N 570 may be checked for color variations. If shadows are present, color variations (such as light and dark regions across text) may be present. If shadows are not present, the variations in extracted text pixels may be minimal. In some embodiments, if the color variations in the extracted CCs are determined to not exceed a predetermined amount, ("No" in step 740), then, the method proceeds to character segmentation module 245. In some embodiments, step 740 may identify false positives for shadow presence.

In some embodiments, if color variations in the extracted CCs are determined to exceed some predetermined amount, ("Yes" in step 740), then, in step 750, noise filtering may be applied to the sub-block based thresholded neighborhood image. In some embodiments, noise filtering may identify and filter out points (noise) whose color values are different from the text color by rebinarizing these points.

In one embodiment, the text color value for extracted CC pixels at word boundaries $B_L^W$ and $B_R^W$, respectively, may be used to identify outliers. For example, in one embodiment, in step 750, text points in the extracted CCs may be clustered based on the color values for extracted CC pixels at word boundaries $B_L^W$ and $B_R^W$, respectively.

Text colors may differ in the shadow and non-shadow regions. Further, text color values for extracted CC pixels at word boundaries $B_L^W$ and $B_R^W$ are known. Accordingly, values of pixels in original neighborhood image N 570 that correspond to pixels in the flood fill extracted CCs may be read and compared with text color values at word boundaries $B_L^W$ and $B_R^W$. In some embodiments, based on the results of the comparison the pixels may be divided into two sets (or clusters). For example, the pixels may be separated in to two sets based on their distance from text color values at word boundaries $B_L^W$ and $B_R^W$. In one embodiment, a fraction (e.g. 10%) of the pixels in a set may selected as outliers based on the extent to which they differ from the average or median text color value for that set.

Further, a set of outlier points comprising points that lie outside the two clusters may be determined. Next, in some embodiments, an edge detector may be used to determine adjacent sub-block boundaries where noise may be present. The points identified by edge detector and the set of outlier points may then be rebinarized in step 750 to reduce noise.

In step 760, the noise filtered image may be flood filled to extract a primary word/CC. The primary word may be clustered with any remaining CCs in the noise filtered image. In some embodiments, clustering rules, such as those used clustering rules module 214 may be used to cluster a plurality of CCs that are part of a word into a new single clustered connected component. For example, for Devanagari, CCs disconnected due to diacritical marks (maatras), broken letters, half-words etc. may be clustered to form a single CC. In general, context and other rules may be used to cluster a plurality of CCs that are part of a word to form a new single clustered connected component. The resulting binarized image 770 may then be output.

Figure 6C:
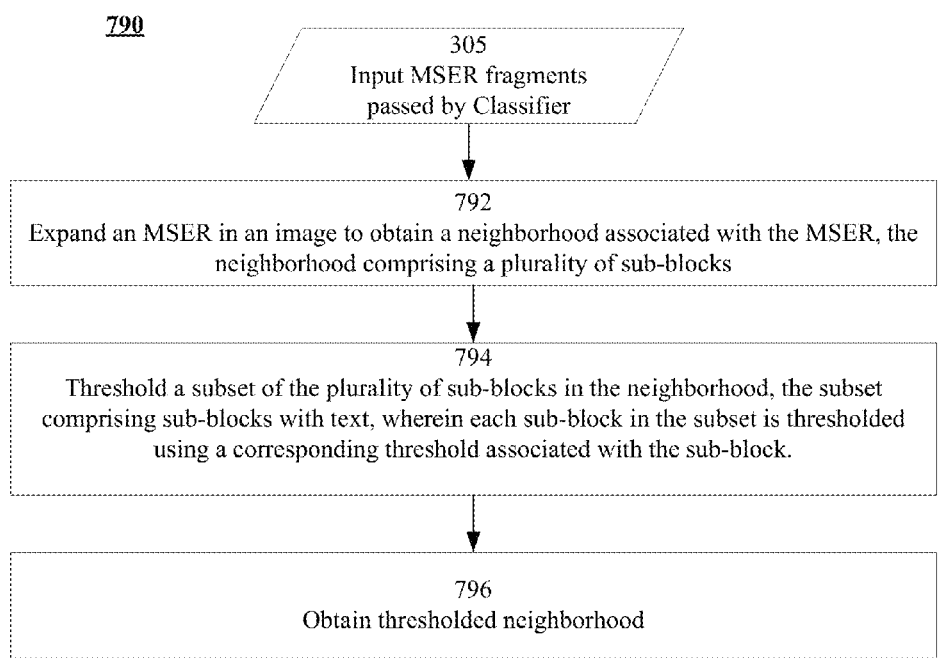
FIG. 6C shows an exemplary flowchart for a method of processing text in the presence of shadows and/or non-uniform lighting conditions in a manner consistent with disclosed embodiments.

FIG. 6C shows an exemplary flowchart for a method 790 for processing text in the presence of shadows and/or non-uniform lighting conditions in a manner consistent with disclosed embodiments. In some embodiments, input binarized MSER text fragment 305 may be input to method 790.

In step 792, a Maximally Stable Extremal Region (MSER) in an image may be expanded to obtain a neighborhood associated with the MSER, wherein the neighborhood may comprise a plurality of sub-blocks. For example, input binarized MSER text fragment 305 may be expanded, in step 792 to obtain a neighborhood 570 associated with the MSER, where neighborhood 570 may comprise a plurality of sub-blocks.

In some embodiments, expanding the MSER may comprise: expanding the MSER in a first direction to determine a first ordered sequence of provisional first boundaries $(B_{i=1}^j, j=1, 2, \ldots)$ and expanding the MSER in a second direction to determine a second ordered sequence of provisional second boundaries $(B_{i=2}^k, k=1, 2, \ldots)$ of the neighborhood; and selecting one of the provisional first boundaries $(B_{i=1}^{j=p})$ in the first ordered sequence and one of provisional second boundaries $(B_{i=1}^{k=q})$ in the second ordered sequence as a first and second boundary of the neighborhood, respectively, wherein the first boundary satisfies $D_{i=1}^{j=p} < f*D_{i=1}^{p-1}$, where 0<f<1, and the second boundary satisfies $D_{i=1}^{k=q} < g*D_{i=2}^{q-1}$, where 0<g<1.

In some embodiments, the method may further comprise, detecting the presence of a shadow in the neighborhood by performing at least one of: a comparison of an absolute average pixel intensity difference between the first and second boundaries with an intensity difference threshold; or a comparison of an entropy of a pixel intensity histogram for the neighborhood with an entropy threshold; or an analysis of a pixel intensity distribution in the pixel intensity histogram for the neighborhood.

In some embodiments, in step 794, a subset of the plurality of sub-blocks in the neighborhood may be thresholded, the subset comprising sub-blocks with text, wherein each sub-block in the subset is thresholded using a corresponding local threshold associated with the sub-block. For example, each sub-block may have a corresponding local threshold associated with the sub-block. Sub-blocks with text may be thresholded using the corresponding local threshold associated with the sub-block.

In some embodiments, the sub-blocks with text may be determined by comparing a variance of pixel intensity values in the sub-block with a pixel intensity variance threshold. In some embodiments, the local threshold associated with the sub-block may be determined by applying Otsu's method to the sub-block. In some embodiments, the sub-blocks may be of equal size and may be a multiple of a stroke width parameter, wherein the stroke width parameter is indicative of the thickness of a character's outline relative to the character's height.

In some embodiments, a thresholded neighborhood may be obtained in step 796. In some embodiments, the method may further comprise, applying flood fill to extract a connected component (CC) associated with the thresholded neighborhood based, at least in part, on a start pixel in the MSER region; determining that color variations present in the extracted connected component exceed a color variation threshold; and applying noise filtering to the thresholded neighborhood.

Figure 7A:
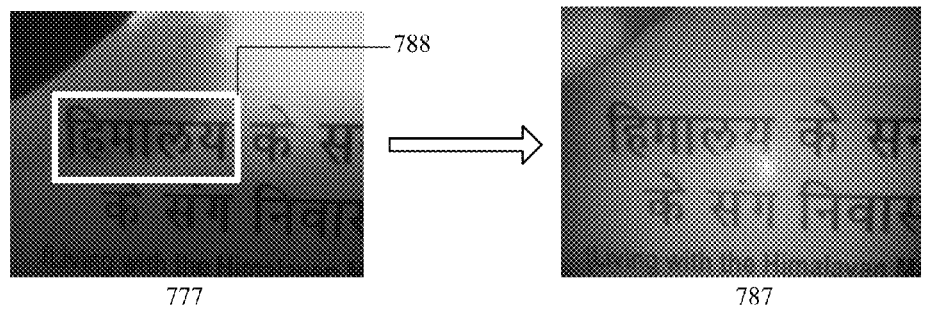
FIG. 7A shows a camera captured image and a camera image captured with the flash set at an adjusted illumination level.

FIG. 7A shows a camera captured image 777 and a camera image captured with flash 787 with the flash set at an adjusted illumination level. As shown in FIG. 7A, camera captured image 777 comprises shadows. In some embodiments, a user may provide input, such as by drawing bounding box 788, to indicate a shadowed region in the image. In some embodiments, a measure of shadow extent in the image region may be obtained and camera image captured with flash 787 may be obtained by adjusting an illumination level of the flash based on the measure of shadow extent. Camera image captured with flash 787 may then be obtained, for example, by capturing a subsequent image by using flash with the adjusted illumination level of the flash.

Figure 7B:
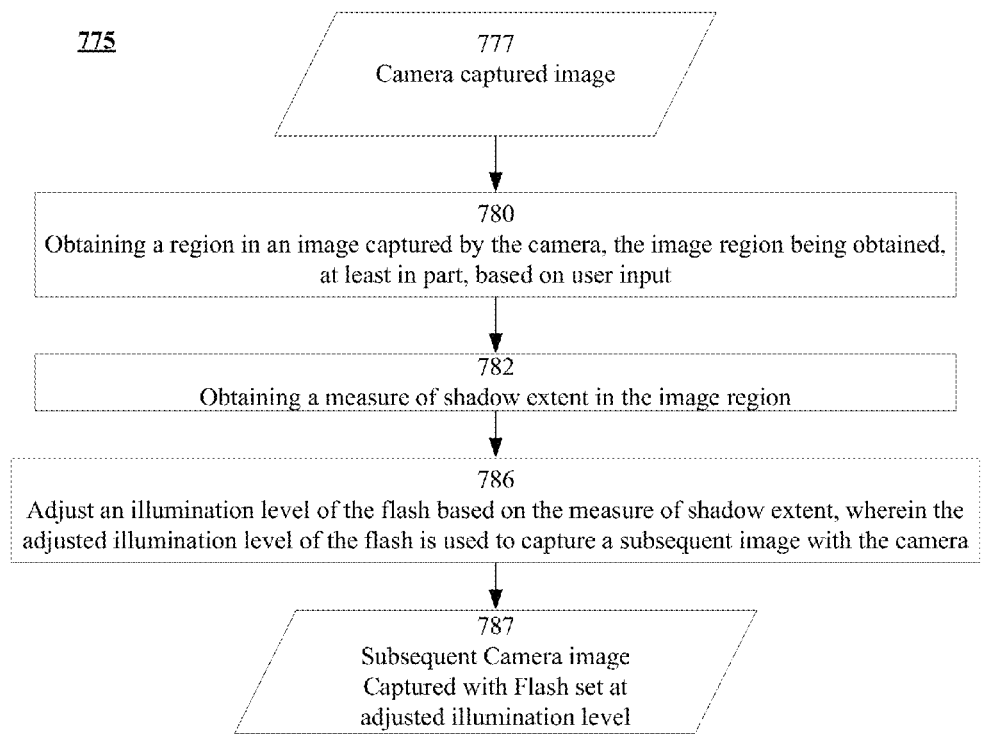
FIG. 7B shows a method for compensating for the presence of shadows and/or non-uniform lighting in a camera captured image.

FIG. 7B shows a method 775 for compensating for the presence of shadows and/or non-uniform lighting in a camera captured image 777. In some embodiments, in step 780, camera captured image 77 may be processed to obtain a region in an image captured by the camera, the image region being obtained, at least in part, based on user input.

In step 785, a measure of shadow extent in the image region may be obtained. For example, a measure of shadow extent may be obtained based, at least in part, on at least one of: a comparison of an absolute average pixel intensity difference between the first and second boundaries with an intensity difference threshold; or a comparison of an entropy of a pixel intensity histogram for the neighborhood with an entropy threshold; or an analysis of a pixel intensity distribution in the pixel intensity histogram for the neighborhood. For example, portions of one of methods, 600, 625 and/or 650 (such as routines 323, 325 and/or 327) may be used to obtain a measure of shadow extent in the image region.

In some embodiments, camera image captured with flash 787 may be obtained by adjusting an illumination level of the flash based on the measure of shadow extent. Camera image captured with flash 787 may then be obtained, for example, by capturing a subsequent image by using flash with the adjusted illumination level of the flash.

Figure 8:
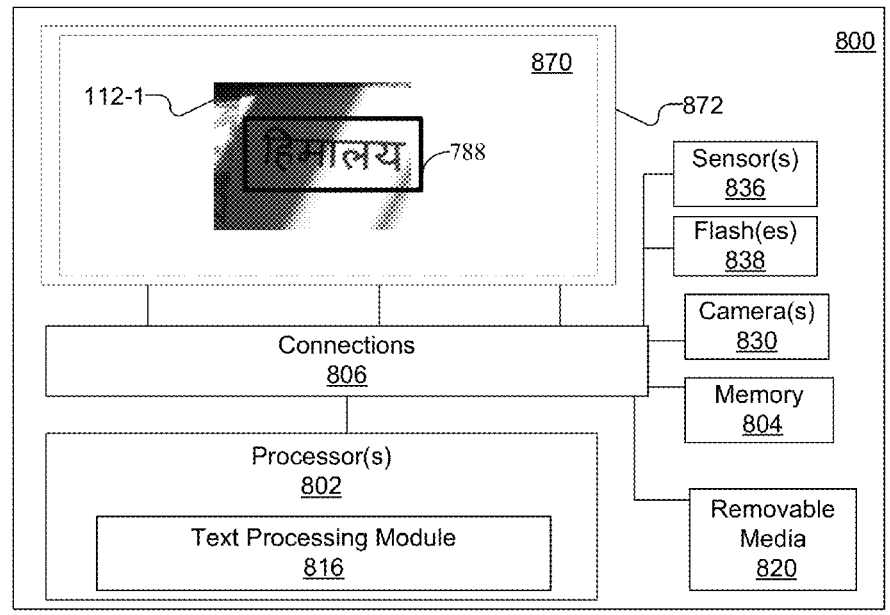
FIG. 8 shows an exemplary Mobile Station (MS) capable of processing text in the presence of shadows in a manner consistent with disclosed embodiments.

FIG. 8 shows schematic block diagram illustrating certain exemplary features of an exemplary mobile device Mobile Station (MS) 800 that may be used facilitate robust and accurate recovery of words and/or characters reliably in the presence of non-uniform lighting and/or shadows in a manner consistent with embodiments disclosed herein. MS 800 may take the form of a smartphone, handheld computing device, laptop, notebook, tablet computer, portable computer, and/or a gaming device. In some embodiments, MS 800 may perform one or more of system 200, and/or methods 300, 310, 340, 600, 625, 650, 790 and/or 775 in whole, or in part.

Mobile Station (MS) 800 may, for example, include: one or more processors 802, memory 804, removable media drive 820, display 870, camera(s) 830 and, as applicable, flash 838, various sensors 836, which may be operatively coupled using one or more connections 806 (e.g., buses, lines, fibers, links, etc.).

In some embodiments, MS 800 may implement one or more of portions of system 200, and/or methods 300, 310, 340, 600, 625, and/or 650 in a manner consistent with disclosed embodiments. For example, processors 802 on MS 800 may comprise Text Processing Module 816, which may implement one or more of portions of system 200, and/or methods 300, 310, 340, 600, 625, and/or 650 in a manner consistent with disclosed embodiments by processing images captured by cameras 830.

In some embodiments, display 870 (shown in FIG. 7 by the dashed block) may permit the display of visual output. Touchscreen 872 may permit users to input data via some combination of virtual keyboards, icons, menus, or other Graphical User Interfaces (GUIs), user gestures and/or input devices such as styli and other writing implements. In some embodiments, touchscreen 872 may overlay display 870, which may concurrently display input entered by a user, images such as image 112-1 captured by camera(s) 830, and/or provide other visual feedback based on the input. In some embodiments, touchscreen 872 may be implemented, for example, using a pressure sensitive screen such as a capacitive or resistive touchscreen. In some embodiments, display 870 may be implemented using a Liquid Crystal Display (LCD) display or a Light Emitting Diode (LED) display, such as an Organic LED (OLED) display. In other embodiments, display 870 may be a wearable display, which may be operationally coupled to, but housed separately from, other functional units in MS 800. In some embodiments, touchscreen 872 may form part of a user input functional unit or module, which may include a combination of hardware and software components to receive input.

Camera(s) 830 may comprise one or more still and/or video image cameras and may incorporate sensors such as CCD and/or CMOS sensors. In some embodiments, camera(s) 830 may be coupled to flashes 838, which may take the form of an electronic flash or other high-intensity illumination devices. In some embodiments, the intensity of flashes 838 may be adjustable. For example, in one embodiment, the intensity of flashes 838 may be adjusted, at least in part, by processors 802 based on a measure of shadow extent in a region of an image captured by camera 830. In some embodiments, the intensity of flashes 838 may also be adjusted based on input from sensors 836, such as, but not limited to, an ambient light sensor. In some embodiments, the duration of flashes 838 may also be adjusted.

Processors 802 may be implemented using a combination of hardware, firmware, and software. In some embodiments, processing unit 802 may include Text Processing Module 816, which may facilitate robust and accurate recovery of words and/or characters reliably in the presence of non-uniform lighting and/or shadows in a manner consistent with embodiments disclosed herein. In some embodiments, processors 802 may perform and/or implement one or more of system 200, and/or methods 300, 310, 340, 600, 625, 650, 790 and/or 775 in whole, or in part.

In some embodiments, Text Processing Module 816 may facilitate robust and accurate recovery of words and/or characters from images (such as image 112-1) captured by camera 830 in the presence of shadows. In some embodiments, Text Processing Module 816 may perform and/or implement one or more of system 200, and/or methods 300, 310, 340, 600, 625, 650, 790 and/or 775 in whole, or in part.

In some embodiments, neighborhood region N 571 may be indicated by a user in captured image 112-1, which includes text with shadows. For example, a user may mark neighborhood region N 571 in image 112-1 captured by camera 830 on MS 800 using touchscreen 872. For example, a bounding box (shown by heavy lines in FIG. 7) may be used by a user to indicate neighborhood region N 788. For example, referring to FIG. 3, in instances, where neighborhood region N 571 has been identified (e.g. by user input) in some embodiments, Text Processing Module 816 may identify word boundaries within neighborhood region N 571 in step 310, and the method may proceed directly to step 320.

In some embodiments, image 112-1, which contains shadows may be captured by cameras 830 and displayed on display 870. In some embodiments, a user may provide input, such as by drawing bounding box 788, to indicate a shadowed region in the image. In some embodiments, a measure of shadow extent in the image region may be obtained by processors 802 and/or text processing module 816 and camera image captured with flash 787 may be obtained by adjusting an illumination level of the flash based on the measure of shadow extent. Camera image captured with flash 787 may then be obtained, for example, by capturing a subsequent image by using flash with the adjusted illumination level of the flash.

In one embodiment, Text Processing Module 816 may process user input received using touchscreen 872, which may capture the coordinates of the points of contact, time(s) or time period(s) associated with each point contact, the sequence in which the points of contact occurred, and/or other parameters associated with each point of contact. The points of contact and parameters associated with each point of contact and/or a set of points of contact may be relayed to Text Processing Module 816, which may use the points of contact and parameters to interpret user gestures to determine bounding box 571 or other user input.

Processors 802 may also be capable of processing other information either directly or in conjunction with one or more other functional blocks shown in FIG. 7. For example, processors 802 may process and combine raw measurements from sensors 836. Sensors 836 may include touch sensors including multi-touch sensors, acoustic sensors such as microphones and speakers, ambient light sensors, and various others, which, in some instances, may be coupled to display 870 and/or touchscreen 872. For example, in one embodiment, input from the ambient light sensor may be used to adjust the brightness of display 870. In some embodiments, processors 802 may represent one or more circuits configurable to perform at least a portion of a computing procedure or process related to Text Processing Module 816 in a manner consistent with disclosed embodiments.

The methodologies described herein may be implemented by various means depending upon the application. For example, these methodologies may be implemented in hardware, firmware, software, or any combination thereof. For a hardware implementation, processors 802 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

For a firmware and/or software implementation, the methodologies may be implemented using procedures, functions, and so on that perform the functions described herein. Any non-transitory machine-readable medium tangibly embodying instructions may be used in implementing the methodologies described herein. Non-transitory computer-readable media may include physical computer storage media. A storage medium may be any available medium that can be accessed by a computer. In one embodiment, software code pertaining to Text Processing Module 816 may be stored in a non-transitory computer-readable medium and read using removable media drive 820 and executed by at least one of processors 802. For example, the methods and/or apparatuses presented herein may take the form in whole or part of a computer-readable medium that may include program code to support Text Processing Module 816 in a manner consistent with disclosed embodiments.

Non-transitory computer-readable media may include a variety of physical computer storage media. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Memory 804 may be implemented within processors 802 and/or external to Processor 802. As used herein the term "memory" refers to any type of long term, short term, volatile, nonvolatile, or other memory and is not to be limited to any particular type of memory or number of memories, or type of media upon which memory is stored. In general, memory 804 may represent any data storage mechanism. Memory 804 may include, for example, a primary memory and/or a secondary memory. Primary memory may include, for example, a random access memory, read only memory, etc. While illustrated in FIG. 7 as being separate from processors 802, it should be understood that all or part of a primary memory may be provided within or otherwise co-located/coupled with processors 802. Memory 804 may hold instructions and data for processors 802, which may used by Text Processing Module 816. For example, memory 804 may hold program code for Text Processing Module 816, databases, lookup tables, font tables, etc.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc. In certain implementations, secondary memory may be operatively receptive of, or otherwise configurable to couple to a non-transitory computer-readable medium in removable drive 820. In some embodiments, non-transitory computer readable medium may form part of memory 804.

Further, exemplary MS 800 may be modified in various ways in a manner consistent with the disclosure, such as, by combining (or omitting) one or more of the functional blocks shown. For example, in some embodiments, MS 800 may comprise one or more of speakers, microphones, transceivers (e.g., wireless network interfaces), Satellite Positioning System (SPS) receivers etc. Further, in certain example implementations, portions of MS 800 may take the form of one or more chipsets, and/or the like.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Figure 9:
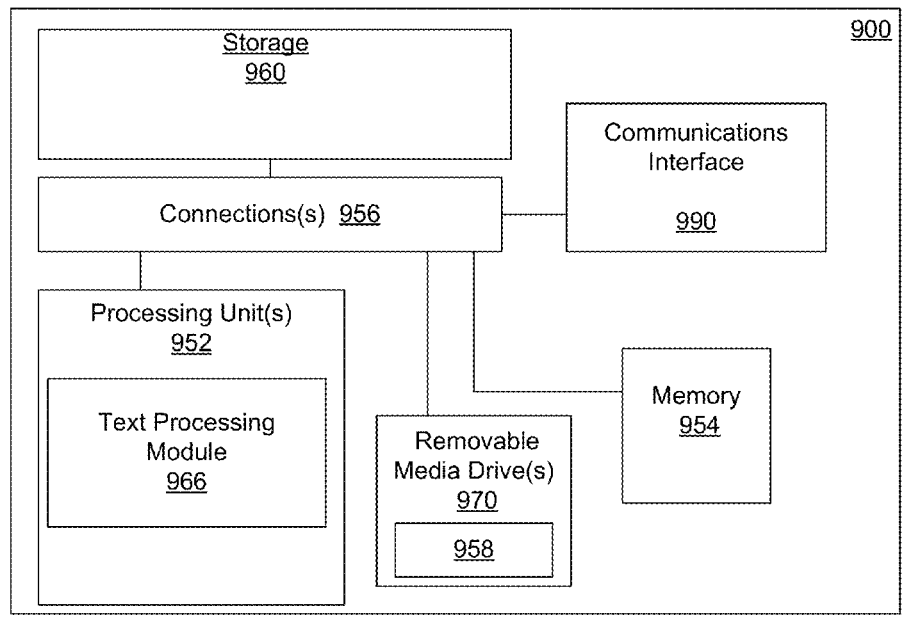
FIG. 9 shows an exemplary server capable of processing text in the presence of shadows in a manner consistent with disclosed embodiments

Reference is now made to FIG. 9, which is a schematic block diagram illustrating a computing device 900 enabled to facilitate robust and accurate recovery of words and/or characters reliably in the presence of non-uniform lighting, contrast variations, and/or shadows in a manner consistent with embodiments disclosed herein. In some embodiments, computing device 900 may take the form of a server, desktop computer, workstation or other device. In some embodiments, computing device 900 may include, for example, one or more processing units 952, memory 954, storage 960, and (as applicable) communications interface 990 (e.g., wireline or wireless network interface), which may be operatively coupled with one or more connections 956 (e.g., buses, lines, fibers, links, etc.). In certain example implementations, some portion of computing device 900 may take the form of a chipset, and/or the like. In some embodiments, computing device 900 may be wirelessly coupled to one or more MS' 800 over a wireless network (not shown), which may one of a WWAN, WLAN or WPAN. For example, in one embodiment, computing device 900 may receive images (e.g. image 112-1) captured by a camera on MS 800 for processing and may process the images to recover of words and/or characters reliably in the presence of non-uniform lighting and/or shadows.

In some embodiments, computing device 900 may implement one or more of portions of system 200, and/or methods 300, 310, 340, 600, 625, and/or 650 in a manner consistent with disclosed embodiments. In some embodiments, the above methods may be performed by processing units 952 and/or Text Processing Module 966 based on images obtained by computing device 900. For example, the above methods may be performed in whole or in part by processing units 952 and/or Text Processing Module 966 in conjunction with one or more functional units on computing device 900 and/or in conjunction with MS 800. For example, computing device 900 may receive a sequence of captured images from MS 800 and may perform portions of one or more of system 200, and/or methods 300, 310, 340, 600, 625, and/or 650 in whole, or in part, using Text Processing Module 966.

Communications interface 990 may include a variety of wired and wireless connections that support wired transmission and/or reception and, if desired, may additionally or alternatively support transmission and reception of one or more signals over one or more types of wireless communication networks. Communications interface 990 may include interfaces for communication with MS 800 and/or various other computers and peripherals. For example, in one embodiment, communications interface 990 may comprise network interface cards, input-output cards, chips and/or ASICs that implement one or more of the communication functions performed by computing device 900. In some embodiments, communications interface 990 may also interface with MS 800 to send processed output, and/or receive images, data and/or instructions related to one or more of system 200, and/or methods 300, 310, 340, 600, 625, and/or 650. In some embodiments, communications interface 990 may be coupled to a camera, scanner, and/or another imaging device and may receive images from the coupled device(s) comprising text for processing.

Processing units 952 may use some or all of the obtained information to perform the requested computations and/or to send the requested information and/or results to MS 800 via communications interface 990. In some embodiments, processing units 952 may be implemented using a combination of hardware, firmware, and software. In some embodiments, processing unit 952 may include Text Processing Module 966, which may implement one or more of portions of system 200, and/or methods 300, 310, 340, 600, 625, and/or 650 in a manner consistent with disclosed embodiments by processing obtained images. In some embodiments, processing unit 952 may represent one or more circuits configurable to perform at least a portion of a data signal computing procedure or process related to the operation of computing device 900.

For example, Text Processing Module 966 may implement OCR and/or portions of system 200, and/or methods 300, 310, 340, 600, 625, and/or 650 based on obtained images. In some embodiments, one or more of the methods above may be invoked during the course of execution of various AR and/or OCR based applications.

The methodologies described herein in flow charts and message flows may be implemented by various means depending upon the application. For example, these methodologies may be implemented in hardware, firmware, software, or any combination thereof. For a hardware implementation, the processing unit 952 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 970, which may support the use of non-transitory computer-readable media 958, including removable media. Program code may be resident on non-transitory computer readable media 958 or memory 954 and may be read and executed by processing units 952. Memory may be implemented within processing units 952 or external to the processing units 952. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 958 and/or memory 954. Examples include computer-readable media encoded with a data structure and computer-readable media encoded with a computer program. For example, non transitory computer-readable medium 958 including program code stored thereon may include program code to facilitate robust and accurate recovery of words and/or characters reliably in the presence of non-uniform lighting and/or shadows in a manner consistent with embodiments disclosed herein.

Computer-readable media may include a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Other embodiments of computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 990, which may store the instructions/data in memory 954, storage 960 and/or relayed the instructions/data to processing units 952 for execution. For example, communications interface 990 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 954 may represent any data storage mechanism. Memory 954 may include, for example, a primary memory and/or a secondary memory. Primary memory may include, for example, a random access memory, read only memory, non-volatile RAM, etc. While illustrated in this example as being separate from processing unit 952, it should be understood that all or part of a primary memory may be provided within or otherwise co-located/coupled with processing unit 952. Secondary memory may include, for example, the same or similar type of memory as primary memory and/or storage 960 such as one or more data storage devices 960 including, for example, hard disk drives, optical disc drives, tape drives, a solid state memory drive, etc. In some embodiments, storage 960 may comprise one or more databases, lookup tables (LUTs), and/or other files that may hold information to facilitate OCR, which may include robust and accurate recovery of words and/or characters reliably in the presence of non-uniform lighting and/or shadows in a manner consistent with embodiments disclosed herein. In some embodiments, information in the databases, LUTs, etc may be read, used and/or updated by processing units 952 and/or Text Processing Module 966 during various computations.

In certain implementations, secondary memory may be operatively receptive of, or otherwise configurable to couple to a computer-readable medium 958. As such, in certain example implementations, the methods and/or apparatuses presented herein may be implemented in whole or in part using non transitory computer readable medium 958 that may include with computer implementable instructions stored thereon, which if executed by at least one processing unit 952 may be operatively enabled to perform all or portions of the example operations as described herein. In some embodiments, computer readable medium 958 may be read using removable media drive 970 and/or may form part of memory 954.

Although the present disclosure is described in relation to the drawings depicting specific embodiments for instructional purposes, the disclosure is not limited thereto. Various adaptations and modifications may be made without departing from the scope. Therefore, the spirit and scope of the appended claims should not be limited to the foregoing description.

What is claimed is:

1. A processor-implemented method for text processing comprising:
expanding a Maximally Stable Extremal Region (MSER) in an image captured by a camera to obtain a neighborhood associated with the MSER, the neighborhood comprising a plurality of sub-blocks;
detecting a shadow in the neighborhood based, at least in part, on parameters associated with intensities of pixels in the neighborhood; and
when a shadow is detected in the neighborhood, thresholding a subset of sub-blocks of the plurality of sub-blocks in the neighborhood, the subset of sub-blocks comprising sub-blocks with text, wherein, to detect the sub-blocks with text, each sub-block in the subset of sub-blocks is thresholded using a corresponding local threshold associated with the sub-block.

2. The method of claim 1, wherein expanding the MSER comprises:
expanding the MSER in a first direction to determine a first ordered sequence of provisional first boundaries ($B_{i=1}^{j}$, j=1, 2, ...) of the neighborhood and expanding the MSER in a second direction to determine a second ordered sequence of provisional second boundaries ($B_{i \times 2}^{k}$, k=1, 2, ...) of the neighborhood; and
selecting one of the provisional first boundaries ($B_{i=1}^{j=p}$) as a first boundary of the neighborhood and one of provisional second boundaries ($B_{i=1}^{k=q}$) as a second boundary of the neighborhood, wherein the first boundary satisfies $D_{i=1}^{j=p} < f^{*} D_{i=1}^{p-1}$, where $0<f<1$, and the second boundary satisfies $D_{i=2}^{k=q} < g^{*} D_{i=2}^{q-1}$, where $0<g<1$, wherein $D_1^j$ is a measure of pixel intensity range at a $j^{th}$ provisional first boundary and $D_2^k$ is a measure of pixel intensity range at a $k^{th}$ provisional second boundary.

3. The method of claim 2, wherein detecting the shadow in the neighborhood comprises performing at least one of:
a comparison of an absolute average pixel intensity difference with an intensity difference threshold, the absolute average pixel intensity difference calculated as an absolute value of a difference between an average pixel intensity of the first boundary and an average pixel intensity of the second boundary; or
a comparison of an entropy of a pixel intensity histogram for the neighborhood with an entropy threshold; or
an analysis of a pixel intensity distribution in the pixel intensity histogram for the neighborhood.

4. The method of claim 1, wherein the subset of sub-blocks with text are determined by comparing a variance of pixel intensity values in each sub-block in the plurality of sub-blocks with a pixel intensity variance threshold.

5. The method of claim 1, wherein, for each sub-block in the subset of sub-blocks, the corresponding local threshold is determined by applying Otsu's method to the corresponding sub-block.

6. The method of claim 1, wherein the plurality of sub-blocks are of equal size and wherein the size of each of the plurality of sub-blocks is based, in part, on a multiple of a stroke width parameter determined from one or more characters of text in the neighborhood, wherein the stroke width parameter is indicative of a thickness of a character's outline relative to the character's height.

7. The method of claim 1, further comprising:
obtaining, based on the thresholding, a thresholded neighborhood;
applying flood fill to extract a connected component (CC) associated with the thresholded neighborhood based, at least in part, on a start pixel located in the MSER;
determining that color variations across a plurality of pixels in the neighborhood exceed a color variation threshold, wherein each of the plurality of pixels in the neighborhood corresponds to a distinct pixel in the extracted connected component; and
applying noise filtering to the thresholded neighborhood.

8. A Mobile Station (MS) comprising:
a camera, the camera to capture an image,
a processor coupled to the camera, wherein the processor is configured to:
expand a Maximally Stable Extremal Region (MSER) in the image to obtain a neighborhood associated with the MSER, the neighborhood comprising a plurality of sub-blocks;
detect a shadow in the neighborhood based, at least in part, on parameters associated with intensities of pixels in the neighborhood; and
when a shadow is detected in the neighborhood, threshold a subset of sub-blocks of the plurality of sub-blocks in the neighborhood, the subset of sub-blocks comprising sub-blocks with text, wherein, to detect the sub-blocks with text, each sub-block in the subset of sub-blocks is thresholded using a corresponding local threshold associated with the sub-block.

9. The MS of claim 8, wherein to expand the MSER, the processor is configured to:
expand the MSER in a first direction to determine a first ordered sequence of provisional first boundaries ($B_{i=1}^{j}$, j=1, 2, ...) of the neighborhood and expand the MSER in a second direction to determine a second ordered sequence of provisional second boundaries ($B_{i=2}^{k}$, k=1, 2, ...) of the neighborhood; and
select one of the provisional first boundaries ($B_{i=1}^{j=p}$) as a first boundary of the neighborhood and one of provisional second boundaries ($B_{i=1}^{k=q}$) as a second boundary of the neighborhood, wherein the first boundary satisfies $D_{i=1}^{j=p} < f^{*} D_{i=1}^{p-1}$, where $0<f<1$, and the second boundary satisfies $D_{j=2}^{k=q} < g^{*} D_{j=2}^{q-1}$, where $0<g<1$, wherein $D_1^j$ is a measure of pixel intensity range at a $j^{th}$ provisional first boundary and $D_2^k$ is a measure of pixel intensity range at a $k^{th}$ provisional second boundary.

10. The MS of claim 9, wherein to detect the shadow in the neighborhood, the processor is configured to perform at least one of:
a comparison of an absolute average pixel intensity difference with an intensity difference threshold, the absolute average pixel intensity difference calculated as an absolute value of a difference between an average pixel intensity of the first boundary and an average pixel intensity of the second boundary; or
a comparison of an entropy of a pixel intensity histogram for the neighborhood with an entropy threshold; or
an analysis of a pixel intensity distribution in the pixel intensity histogram for the neighborhood.

11. The MS of claim 8, wherein the processor is configured to:
    determine sub-blocks with text by comparing a variance of pixel intensity values in each sub-block in the plurality of sub-blocks with a pixel intensity variance threshold.

12. The MS of claim 8, wherein the processor is configured to:
    determine the local threshold associated with the sub-block by applying Otsu's method to the sub-block.

13. The MS of claim 8, wherein the plurality of sub-blocks are of equal size and wherein the size of each of the plurality of sub-blocks is based, in part, on a multiple of a stroke width parameter determined from one or more characters of text in the neighborhood, wherein the stroke width parameter is indicative of a thickness of a character's outline relative to the character's height.

14. The MS of claim 8, wherein the processor is further configured to:
    obtain, based on the thresholding, a thresholded neighborhood;
    apply flood fill to extract a connected component (CC) associated with the thresholded neighborhood based, at least in part, on a start pixel located in the MSER;
    determine that color variations across a plurality of pixels in the neighborhood exceed a color variation threshold, wherein each of the plurality of pixels in the neighborhood corresponds to a distinct pixel in the extracted connected component; and
    apply noise filtering to the thresholded neighborhood.

15. An apparatus comprising:
    image capturing means, the image capturing means to capture an image, and
    text processing means coupled to the image capturing means, the text processing means comprising:
        means for expanding a Maximally Stable Extremal Region (MSER) in the image to obtain a neighborhood associated with the MSER, the neighborhood comprising a plurality of sub-blocks;
        means for detecting a shadow in the neighborhood based, at least in part, on parameters associated with intensities of pixels in the neighborhood; and
        means for thresholding a subset of sub-blocks of the plurality of sub-blocks in the neighborhood when a shadow is detected, the subset of sub-blocks comprising sub-blocks with text, wherein each sub-block in the subset of sub-blocks is thresholded using a corresponding local threshold associated with the sub-block.

16. The apparatus of claim 15, wherein means for expanding the MSER further comprises:
    means for expanding the MSER in a first direction to determine a first ordered sequence of provisional first boundaries ($B_{i=1}^{j}$, j=1, 2, . . . ) of the neighborhood;
    means for expanding the MSER in a second direction to determine a second ordered sequence of provisional second boundaries ($B_{i=2}^{k}$, k=1, 2, . . . ) of the neighborhood; and
    means for selecting one of the provisional first boundaries ($B_{i=1}^{j=p}$) as a first boundary of the neighborhood and one of provisional second boundaries ($B_{i=1}^{k=q}$) as a second boundary of the neighborhood, wherein the first boundary satisfies $D_{i=1}^{j=p} < f*D_{i=1}^{p-1}$, where 0<f<1, and the second boundary satisfies $D_{j=2}^{k=q} < g*D_{j=2}^{q-1}$, where 0<g<1, wherein $D_1^j$ is a measure of pixel intensity range at a $j^{th}$ provisional first boundary and $D_2^k$ is a measure of pixel intensity range at a $k^{th}$ provisional second boundary.

17. The apparatus of claim 16, wherein the means for detecting the shadow comprises at least one of:
    means for comparing an absolute average pixel intensity difference with an intensity difference threshold, the absolute average pixel intensity difference calculated as an absolute value of a difference between an average pixel intensity of the first boundary and an average pixel intensity of the second boundary; or
    means for comparing an entropy of a pixel intensity histogram for the neighborhood with an entropy threshold; or
    means for analyzing a pixel intensity distribution in the pixel intensity histogram for the neighborhood.

18. The apparatus of claim 15, wherein the subset of sub-blocks with text are determined by comparing a variance of pixel intensity values in each sub-block in the plurality of sub-blocks with a pixel intensity variance threshold.

19. The apparatus of claim 15, wherein means for thresholding the subset of sub-blocks comprises:
    means for applying Otsu's method to each sub-block to determine the corresponding local threshold.

20. The apparatus of claim 15, wherein the plurality of sub-blocks are of equal size and, wherein the size of each of the plurality of sub-blocks is based, in part, on a multiple of a stroke width parameter determined from one or more characters of text in the neighborhood, wherein the stroke width parameter is indicative of a thickness of a character's outline relative to the character's height.

21. The apparatus of claim 15, further comprising:
    means for obtaining, based on the thresholding, a thresholded neighborhood;
    means for flood filling, the means for flood filling to extract a connected component (CC) associated with the thresholded neighborhood based, at least in part, on a start pixel located in the MSER;
    means for determining that color variations across a plurality of pixels in the neighborhood exceed a color variation threshold, wherein each of the plurality of pixels in the neighborhood corresponds to a distinct pixel in the extracted connected component; and
    means for applying noise filtering to the thresholded neighborhood.

22. A non-transitory computer-readable medium comprising instructions, which when executed by a processor, perform steps in a method for text processing comprising:
    expanding a Maximally Stable Extremal Region (MSER) in an image captured by a camera to obtain a neighborhood associated with the MSER, the neighborhood comprising a plurality of sub-blocks;
    detecting a shadow in the neighborhood based, at least in part, on parameters associated with intensities of pixels in the neighborhood; and
    when a shadow is detected in the neighborhood, thresholding a subset of sub-blocks of the plurality of sub-blocks in the neighborhood, the subset of sub-blocks comprising sub-blocks with text, wherein, to detect the sub-blocks with text, each sub-block in the subset of sub-blocks is thresholded using a corresponding local threshold associated with the sub-block.

23. The computer-readable medium of claim 22, wherein expanding the MSER comprises:
    expanding the MSER in a first direction to determine a first ordered sequence of provisional first boundaries ($B_{i=1}^j$, j=1, 2, ... ) of the neighborhood and expanding the MSER in a second direction to determine a second ordered sequence of provisional second boundaries ($B_{i=2}^k$, k=1, 2, ... ) of the neighborhood; and selecting one of the provisional first boundaries ($B_{i=1}^{j=p}$) as a first boundary of the neighborhood and one of provisional second boundaries ($B_{i=1}^{k=q}$) in the second ordered sequence as a first and as a second boundary of the neighborhood, respectively, wherein the first boundary satisfies $D_{i=1}^{j=p} < f*D_{i=1}^{p-1}$, where $0<f<1$, and the second boundary satisfies $D_{i=2}^{k=q} < g*D_{i=2}^{q-1}$, where $0<g<1$, wherein $D_1^j$ is a measure of pixel intensity range at a $j^{th}$ provisional first boundary and $D_2^k$ is a measure of pixel intensity range at a $k^{th}$ provisional second boundary.

24. The computer-readable medium of claim 23, wherein detecting the shadow in the neighborhood comprises performing at least one of:
   a comparison of an absolute average pixel intensity difference with an intensity difference threshold, the absolute average pixel intensity difference calculated as an absolute value of a difference between an average pixel intensity on the first boundary and an average pixel intensity on the second boundary; or
   a comparison of an entropy of a pixel intensity histogram for the neighborhood with an entropy threshold; or
   an analysis of a pixel intensity distribution in the pixel intensity histogram for the neighborhood.

25. The computer-readable medium of claim 22, wherein the subset of sub-blocks with text are determined by comparing a variance of pixel intensity values in each sub-block in the plurality of sub-blocks with a pixel intensity variance threshold.

26. The computer-readable medium of claim 22, wherein, for each sub-block in the subset of sub-blocks, the corresponding local the local threshold associated with the sub-block is determined by applying Otsu's method to the corresponding sub-block.

27. The computer-readable medium of claim 22, wherein the plurality of sub-blocks are of equal size and wherein the size of each of the plurality of sub-blocks is based, in part, on a multiple of a stroke width parameter determined from one or more characters of text in the neighborhood, wherein the stroke width parameter is indicative of a thickness of a character's outline relative to the character's height.

28. The computer-readable medium of claim 22, further comprising:
   obtaining, based on the thresholding, a thresholded neighborhood;
   applying flood fill to extract a connected component (CC) associated with the thresholded neighborhood based, at least in part, on a start pixel located in the MSER;
   determining that color variations across a plurality of pixels in the neighborhood exceed a color variation threshold, wherein each of the plurality of pixels in the neighborhood corresponds to a distinct pixel in the extracted connected component; and
   applying noise filtering to the thresholded neighborhood.

* * * * *